United States Patent [19]

Barone

[11] Patent Number: 5,742,495

[45] Date of Patent: Apr. 21, 1998

[54] POWER CONVERTER WITH SOFT SWITCHING

[75] Inventor: Fabio Barone, Randwick NSW, Australia

[73] Assignee: Unisearch Limited, Australia

[21] Appl. No.: 722,263

[22] PCT Filed: Feb. 1, 1995

[86] PCT No.: PCT/AU95/00041

§ 371 Date: Oct. 8, 1996

§ 102(e) Date: Oct. 8, 1996

[87] PCT Pub. No.: WO95/21486

PCT Pub. Date: Aug. 10, 1995

[30] Foreign Application Priority Data

Feb. 1, 1994 [AU] Australia ................. PM3643

[51] Int. Cl.$^6$ ................................................. H02M 5/45
[52] U.S. Cl. ................................................. 363/65
[58] Field of Search .......................... 363/56, 127, 124, 363/152, 98, 44, 45, 65, 41; 318/762

[56] References Cited

U.S. PATENT DOCUMENTS

| | | | |
|---|---|---|---|
| 5,552,695 | 9/1996 | Schwartz | 323/271 |
| 5,559,685 | 9/1996 | Lauw et al. | 363/37 |
| 5,574,636 | 11/1996 | Lee et al. | 363/132 |

FOREIGN PATENT DOCUMENTS

| | | |
|---|---|---|
| 57700/90 | 1/1991 | Australia . |
| 0193366 | 9/1985 | European Pat. Off. . |
| 543204 | 5/1993 | European Pat. Off. . |

*Primary Examiner*—Aditya Krishnan
*Attorney, Agent, or Firm*—Ostrolenk, Faber, Gerb & Soffen, LLP

[57] ABSTRACT

The present invention relates to electrical conversion between electrical systems, e.g. inversion. An improved power converter is disclosed, which utilizes zero current switched and zero voltage stitched switching networks either side of a link. An operating state in which one network is disconnected from the link (a zero power flow state) results in an increase in efficiency.

14 Claims, 22 Drawing Sheets

State 1. Forward power #1.

State 3. Reverse power #1.

State 4a. Quench link current #1.

State 4b. Zero link current #1.

State 4c. Re-establish link current #1.

State 5. Forward power #2.

State 7. Reverse power #2.

State 8a. Quench link current #2.

State 8b. Zero link current #2.

State 8c. Re-establish link current #2

| STATE | TERMINATION EVENT |
|---|---|
| 1 | FORWARD POWER FLOW TIMER |
| 2a | ZVS SENSE ON Q4 |
| 2b | ZERO LINK VOLTAGE TIMER |
| 2c | ZVS SENSE ON Q3 |
| 3 | REVERSE POWER FLOW TIMER |
| 4a | ZCS SENSE ON T2 |
| 4b | ZERO LINK CURRENT TIMER |
| 4c | ZCS SENSE ON T1 |
| 5 | FORWARD POWER FLOW TIMER |
| 6a | ZVS SENSE ON Q2 |
| 6b | ZERO LINK VOLTAGE TIMER |
| 6c | ZVS SENSE ON Q1 |
| 7 | REVERSE POWER FLOW TIMER |
| 8a | ZCS SENSE ON T4 |
| 8b | ZERO LINK CURRENT TIMER |
| 8c | ZCS SENSE ON T3 |

FIG. 11B

| STATE | Q1 | Q2 | Q3 | Q4 | T1 | T2 | T3 | T4 |
|---|---|---|---|---|---|---|---|---|
| 1 | 1 | 1 | 0 | 0 | 1 | 1 | 0 | 0 |
| 2a | 0 | 1 | 0 | 0 | 1 | 1 | 0 | 0 |
| 2b | 0 | 1 | 0 | 1 | 1 | 1 | 0 | 0 |
| 2c | 0 | 0 | 0 | 1 | 1 | 1 | 0 | 0 |
| 3 | 0 | 0 | 1 | 1 | 1 | 1 | 0 | 0 |
| 4a | 0 | 0 | 1 | 1 | 1 | 1 | 0 | 1 |
| 4b | 0 | 0 | 1 | 1 | 1 | 0 | 0 | 1 |
| 4c | 0 | 0 | 1 | 1 | 1 | 0 | 1 | 1 |
| 5 | 0 | 0 | 1 | 1 | 0 | 0 | 1 | 1 |
| 6a | 0 | 0 | 0 | 1 | 0 | 0 | 1 | 1 |
| 6b | 0 | 1 | 0 | 1 | 0 | 0 | 1 | 1 |
| 6c | 0 | 1 | 0 | 0 | 0 | 0 | 1 | 1 |
| 7 | 1 | 1 | 0 | 0 | 0 | 0 | 1 | 1 |
| 8a | 1 | 1 | 0 | 0 | 0 | 1 | 1 | 1 |
| 8b | 1 | 1 | 0 | 0 | 0 | 1 | 1 | 0 |
| 8c | 1 | 1 | 0 | 0 | 1 | 1 | 1 | 0 |

NOTE:
"1" DENOTES THAT THE DEVICE IS ON.
"2" DENOTES DEVICE IS OFF

FIG. 11C

POWER CONVERTER WITH SOFT SWITCHING

The present invention relates to a process for providing electrical power conversion and, in particular, to a process which enables controllable transfer of power across a link between electrical systems.

The present invention also provides apparatus for carrying out such a power conversion, and, in particular, for enabling controllable transfer of power across a link between electrical systems.

Processes that result in a change in electric power form, or electrical isolation, or both, are known as "power conversions", and devices that carry out such processes are known as "power converters". This term is reserved for power converters which use "active" devices. An active device is one that can behave as a switch and can change state either by external command signal or according to conditions within the circuit. Thus, transformers are not classified as "power converters", even though they can change voltage amplitudes and provide isolation, since they are not switches. Power conversion processes are well known and described in the literature (Kassakian [1] Kassakian, Schlect, Verghese "Principles of Power Electronics" Addison-Wesley Publishing Company, Inc., 1991. ISBN 0-201-09689-7.

An electric circuit which carries out the rectification process is termed a "rectifier". An electric circuit which can execute the inversion process is termed an "inverter". Some implementations of these circuits are capable of performing both processes, in which case they may be termed "bi-directional inverters", although they are often referred to as just "inverters". Circuits which perform DC to DC conversion are called "DC to DC converters" and "bi-directional DC to DC converters", depending if power flow can be bi-directional.

These circuits may be implemented in many ways, using many different circuit designs and electronic component technologies. Power conversion efficiency is a major consideration in the design of power conversion circuits. For this reason, designers use switching techniques in the circuits of power converters. The switches dissipate very little power since they are either on or off. By configuring the switches within a circuit in a certain manner, and operating the switches in a prescribed way, power may be converted from a low frequency form to a high frequency form. By applying filters, which may include inductors and/or capacitors, the high frequency output may be smoothed into the desired form. The switches may be implemented in many ways, including semiconductors such as Bipolar Junction Transistors (BJT) and Silicon Controlled Rectifiers (SCR). These techniques are well known to those versed in the art.

However, the switching techniques commonly employed result in significant energy being lost while the switch is changing state from off to on and vice versa. This switching action is termed "hard-switching" and the energy loss is termed "switching loss". There are a number of circuit techniques that can alleviate switching stresses while at the same time reducing switching power losses. Such "soft-switching" techniques result in improved power conversion efficiency, allow higher frequency of operation, and reduce electromagnetic interference (EMI). There are two types of soft-switching: Zero-Voltage-Switching (ZVS) and Zero-Current-Switching (ZCS), both of which are well known by those skilled in the art. A discussion of ZVS will be found in the United States Patent by Steigerwald et al. [2] (U.S. Pat. No. 4,864,479 "Full-Bridge Lossless Switching Converter") column 4 line 35 onwards. An explanation of the type of soft-switching exhibited by embodiments of the present invention will be found in [3] Barone, F. "A Compact, Light-Weight Inverter", Proc. of a Workshop on "PV in Grid-Connected and Remote Area Stand-Alone Systems", University of New South Wales, 12-13 May, 1992, pp 130-140 and [4] Barone, F., Spooner, E. D., Daly, K. C., "A High-Efficiency, Bi-Directional, Lightweight Inverter/Charger.", Proc. Australasian Universities Power Engineering Conference, October 1993, pp. 202-209.

The present invention is an improvement to the inventions described in the above references by Barone et al. The present invention provides a power conversion apparatus, comprising first and second switching networks, the first switching network being arranged to be connected to a source of constant voltage and the second switching network being arranged to be connected to a source of constant current, a link between the first and second switching network by way of which electrical power may flow between them, and control means for controlling switches in the switching networks to control the flow of electrical power, the control means being arranged to control the switching networks to exhibit a plurality of operating states during a single cycle of operation, the operating states including at least one forward power state, in which power flows across the link from the voltage source to the current source and at least one reverse power state in which power flows across the link from the current source to the voltage source, and at least one operating state of at least one of the switching networks is a zero power flow state, wherein there is no power flow between the link and the at least one switching network.

Providing switching networks on either side of the link preferably enables transfer of electrical power across the link during a single cycle of operation of the switching networks. Power transfer during the single cycle preferably takes place bi-directionally across the link, the amount of net power transfer between the electrical systems depending on the ratio of power transferred in one direction across the link during the cycle to power transferred in the other direction across the link during the cycle of operation. This ratio is preferably controllable.

More than two switching networks may be connected to a link. Power transfer across the link will become more complex in such a case and will also depend on the zero power flow state.

A "switching network" includes any system including a switch or switches capable of switching electrical current.

During one "cycle of operation" the state of the switches of the networks is controllably altered from a first state through one or more other states back again to the first state, e.g. a conventional switching inverter comprising four bipolar junction transistors arranged in a bridge configuration and having an initial state with transistors 1 and 2 on would be considered to have travelled through a complete cycle via transistors 1 and 2 going off, transistors 3 and 4 coming on, transistors 3 and 4 going off and transistors 1 and 2 coming on again.

The control means preferably controls operation of the switching networks such that the switching network on one side of the link is controlled to exhibit zero voltage switching (ZVS) and the switching network on the other side of the link is controlled to exhibit zero current switching (ZCS). These terms are known to people skilled in the art. The switching networks are preferably controlled so that the ZVS and ZCS are complementary, such that electrical transfer across the link between the switching networks is controlled to reduce losses to a minimum. During a complete cycle of operation of the switching networks, one switching network is preferably controlled to exhibit ZVS and the other switching network is preferably controlled to exhibit ZCS.

The use of ZVS and ZCS preferably enables operation of the circuit at relatively higher frequencies. For example, an inverter can be implemented substantially losslessly using this circuit and employing very high switching frequencies. This increases efficiency and enables the use of a much smaller transformer than normal, where a transformer is employed.

The electrical systems connected by the link preferably include on one side an electrical element which acts as a constant voltage source, or can be considered to act as a constant voltage source, at least for the purposes of the time period comparable to one cycle of operation of the switching networks, and on the other side of the link an electric element which can be considered to act as a constant current source, at least for a time period comparable to one cycle of operation of the switching network.

The introduction of the zero power flow state preferably enables more precise control of the power transfer operation, and preferably results in a further increase in efficiency and flexibility of the circuit.

The zero power flow state may be a zero link current state wherein no current flows between the link and the at least one switching network, or a zero link voltage state wherein no voltage from the at least one switching network is present at the link.

Preferably the zero voltage switching and zero current switching are complementary between the networks. In at least preferred embodiments, this results in an increase in efficiency of operation of the apparatus and enables the apparatus to operate at relatively high frequencies.

The apparatus is preferably arranged to be connected between any power source and load, as long as one of the power sources or loads is configured to act as a constant voltage source and the other power source and load is configured to act as constant current source, at least for the duration of one cycle of the apparatus. Circuit elements may be provided to ensure that the conversion apparatus perceives a voltage source and a current source for the at least one cycle of operation. For example, capacitors may be provided to give the impression of a constant voltage source and inductors to give the impression of a constant current source.

The present invention further provides a method of converting electrical power between two electrical systems having a link between them, comprising the steps of providing separate switching networks on either side of the link and controlling each of the switching networks to cause power to be transferred across the link between the electrical systems, the step of controlling switching of the networks comprising controlling the switches such that the networks exhibit a plurality of operating states during a single cycle of operation, the plurality of operating states including at least one forward power state and at least one reverse power state, the ratio of the forward power state to the reverse power state determining the net power transfer across the link, and at least one operating state of at least one of the switching networks is a zero power flow state wherein there is no power flow between the link and the at least one switching network.

The present invention preferably enables control of power transfer from one electrical system to another, e.g. from a power source to a load. The amount of power transferred is controlled by controlling the ratio discussed above, which is the ratio between "forward" power transfer and "reverse" power transfer. No net power transfer needs to take place from one electrical system to the other, i.e. where the ratio between forward and reverse is one to one. However, in most practical systems some net power transfer will be taking place.

Preferably, the method of the present invention includes the step of controlling the first switching network to exhibit ZVS and the second switching network to exhibiting ZCS. By controlling the networks so that ZVS and ZCS are complementary, the losses caused by switching in the network may be reduced to a minimum.

The electrical systems connected by the link preferably include voltage stiff and current stiff electrical elements, in the sense already discussed above.

In the present invention, electrical isolation may be provided between the electrical systems, or not, as desired. For example, the link between the systems could be formed by a transformer if electrical isolation is desired.

The present invention can be used in at least preferred embodiments, to convert any conceivable form of electrical power into any other form, with electrical isolation if so required. For example, the present invention can be used to perform DC to AC inversion, AC to DC rectification, etc.

At least preferred embodiments of the present invention have the advantage that they are inherently suited for bi-directional power flow between systems, which is of particular advantage in may applications. In battery driven electric cars, for example, during acceleration, power flows from the battery to the drive, but during braking it is advantageous to return the power flow from the braking kinetic energy to the battery in order to charge the battery. Embodiments of the present invention provide a convenient power conversion interface for such a system, allowing for bi-directional power flow.

Where ZVS and ZCS are applied in the switching networks, because of the low losses involved during switching, it means that the switches can preferably be switched at a very high rate. This preferably results in higher power conversion efficiency and higher switching frequency. All filter components operate at higher frequency and are therefore of reduced dimensions. Furthermore, any transformer that may be required will be excited at the higher switching frequency, which leads to greatly reduced weight and dimensions compared with transformers designed to operate from a low frequency. Many of the components may be integrated. The present invention preferably allows soft-switching without excessive device peak stress. It does not need to rely on resonant transfer for soft-switching.

Because the switching is preferably done under favourable conditions for each switch, with little or no power loss, the invention preferably provides improved power conversion efficiency, high operating frequency, low electromagnetic interference and high reliability. Use of exotic and expensive fast devices is not necessary. The higher frequency operation results in lower noise levels as it may be beyond human hearing frequency, and allows fast response to commands and load variations.

Embodiments of the present invention can be applied in many situations and can be used to convert any voltage or current to any other voltage or current, from power levels of under 100 watts to over 10 megawatts, for example. Any number of switching networks can be used either side of a high frequency link to achieve reliability through redundancy and higher power levels, and connect more than two power sources or power loads.

A plurality of switching networks may be connected on one side of the link to a plurality of separate source/loads. This enables power conversion between a number of loads/sources across a single link.

Further, multiple switching networks may be connected to a single load/source.

In the limit, each switching network can be considered independently of all other networks, since the important issue is how each network behaves when connected to the link.

Features and advantages of the present invention will become apparent from the following description of embodiments thereof, by way of example only, with reference to the accompanying drawings, in which.

Figure 1:
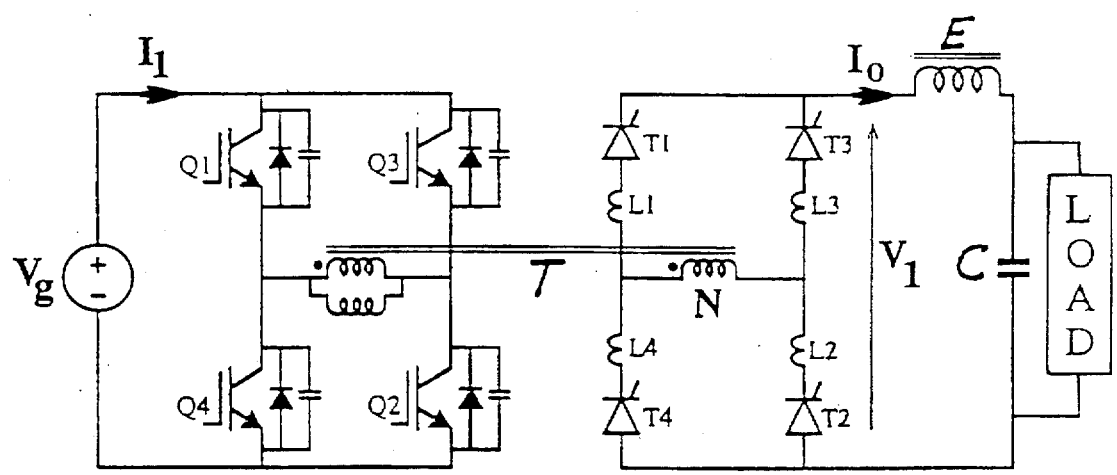
FIG. 1 is a "legend" for subsequent figures.
Figure 2:
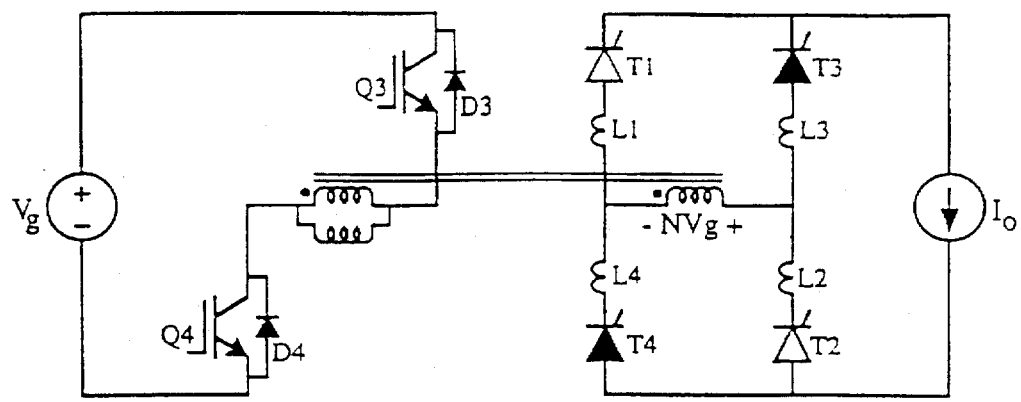
FIG. 2 shows a prior art circuit diagram for power conversion across a link between a voltage source and a current source.
Figure 11A:
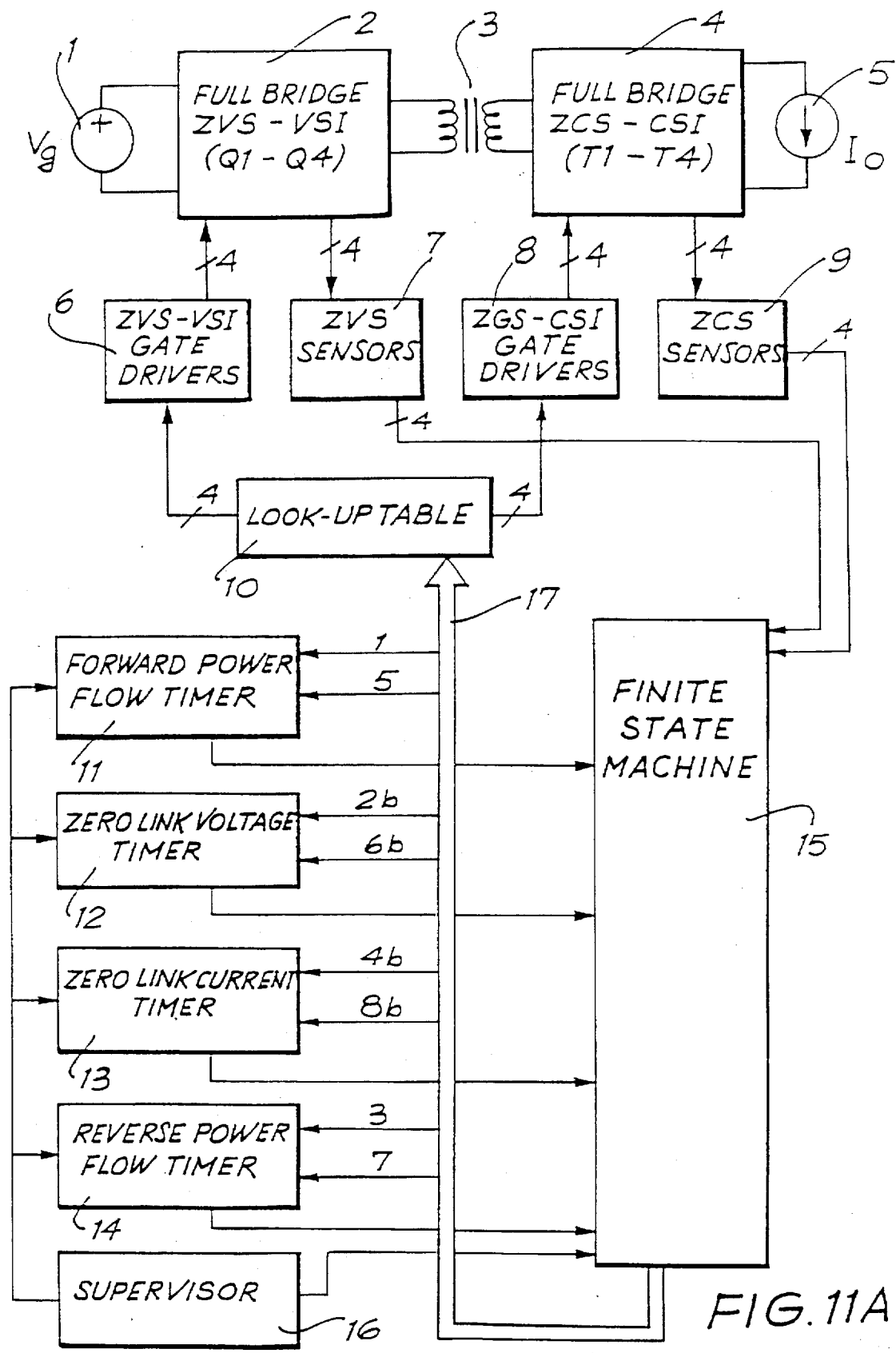

FIGS. 3A–H show state circuit diagrams illustrating operation of the circuit of FIG. 2;

FIGS. 4A–L shows a series of waveforms of the circuit of FIG. 2 for illustrating operation thereof;

FIGS. 5–10 show state circuit diagrams for illustrating operation of various embodiments of the present invention;

FIGS. 11A–11C show a circuit block diagram illustrating a further embodiment of the present invention with associated control circuitry for controlling operation of the switching networks, a definition of a finite state machine used in the control circuitry (FIG. 11B) and a look-up table (FIG. 11C).

DESCRIPTION OF PRIOR ART BY BARONE ET AL [3, 4]

FIGS. 2 through show a power converter and state diagrams illustrating operation thereof. This power converter is disclosed in Barone et al. [3,4]. This prior art power converter is known as FIC3 (phase-shift modulated inverter cascade with soft-switching). It consists of two full-bridge inverters on each side of a high frequency link, as shown in FIG. 2. The link may include a high-frequency transformer T, although it is not necessary for circuit operation. A zero-voltage-switched voltage-sourced-inverter (ZVS-VSI) is on the primary side, while a zero-current-switched current-sourced-inverter (ZCS-CSI) is on the secondary side. As drawn, the primary side is connected to the power source, $V_g$, while the secondary side is connected to the output load LOAD, although it will be shown that the topology is fully bi-directional in terms of power flow, so these terms are meant for illustrative purposes only. The output filter comprises an inductor E and capacitor C, which presents a current-source to the ZCS-CSI.

The ZVS-VSI is connected to a voltage-stiff source Vg, which could be either a battery, a photovoltaic array, a constant voltage supply, or a filter capacitor whose voltage remains essentially constant for the duration of one cycle of operation of FICS. The switching devices, labelled Q1 through Q4, shown in the diagram are IGBTs with anti-parallel diodes, D1 through D4 and lossless snubber capacitors C1 through C4. The diodes and capacitors may be realised as actual or parasitic components. Other switch technologies may be used.

The ZCS-CSI is connected to a current-stiff source. The current-stiff source can be realised by placing a sufficiently large inductor E, in series with the load, which may itself be either voltage-stiff or current-stiff. The ZCS-devices in the ZCS-CSI, labelled T1 through T4, are drawn as SCRs, although other switch technologies may be used. L1 through L4 are snubber inductors which may be realised as actual or parasitic components.

The two sides may be either linked together directly, or via a small high frequency transformer for isolation and/or voltage transformation. The transformer is not necessary for operation of FICS. This link experi ences high frequency voltages and currents, hence the term "high frequency link". The transformer is drawn with its magnetising inductance shown, since the magnetising current plays an important role in circuit operation under light load conditions.

Being capable of bi-directional power flow, using the terms "source" and "load" can be somewhat misleading. The power source may be placed on the current-stiff side or on the voltage-stiff side, it does not matter. Further, practical loads can change form dynamically, and alternate between appearing as a power source and power sink. FICS is inherently capable of dynamic control of power flow, and so can handle these types of loads.

Being a non-linear system containing switches, FICS takes on several different states during one complete cycle of operation. Each state is described in the following sections, and depicted in FIGS. 3A through 3L. For clarity, only those devices conducting current and taking an active part are shown in each state diagram. It is assumed that the output filter may be replaced by an equivalent constant current source for the duration of one switching cycle. This assumption is typical for initial analysis of such circuits.

Appropriate control circuitry for controlling the power converter of FIG. 2 in accordance with the tolling control scheme may be realised by a person skilled in the art.

Figure 3A:
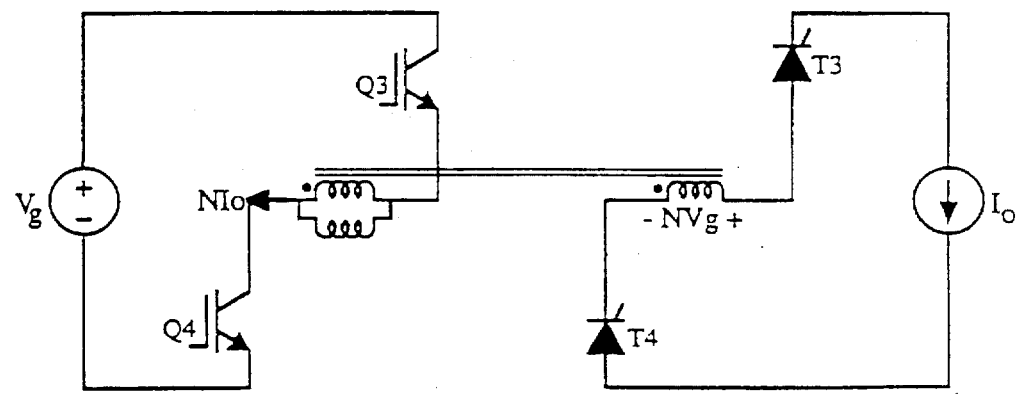

State 1. Forward Power #1. (FIG. 3A)

Q1 and Q2 are both on, which applies a positive voltage to the link via the transformer. T1 and T2 are on and they are directing the current source in a positive direction to the link. From the convention used for polarities, the link is transferring power from the voltage source to the current source, which we shall denote as positive power flow. Notice that T3 and T4 are reverse biased, and cannot be turned on.

Figure 3B:
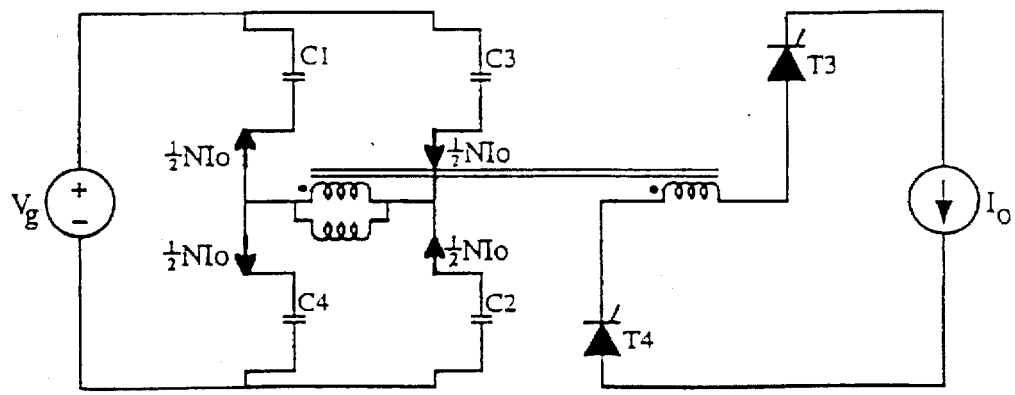

State 2. Invert Link Voltage #1. (FIG. 3B)

Under command from the control scheme, both Q1 and Q2 are now turned off. The primary current, being driven by the switches on the secondary side, must continue to flow, and so it diverts into the lossless snubber capacitors, which are now shown in the figure. The direction of primary current has the effect of increasing the voltages across the outgoing switches Q1 and Q2, but decreasing the voltage across the incoming switches Q3 and Q4. This is zero voltage switching (ZVS). At no load, the transition is driven by the magnetising current. This state should only occur briefly. The link voltage changes polarity with controlled dv/dt, given by: dv/dt=NIo/C, where Io is the load current, N is the secondary to primary turns ratio and C is the value of each snubber capacitor.

Figure 3C:
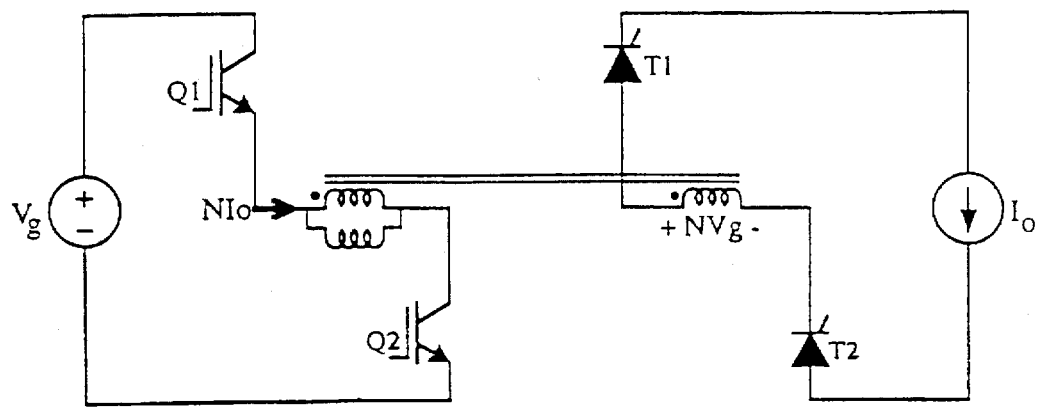

State 3. Reverse Power #1. (FIG. 3C)

The voltage transition is now completed, and the anti-parallel diodes of Q3 and Q4 are on, clamping the link voltage and facilitating ZVS for Q3 and Q4. Notice that the link voltage has now changed polarity, but the link current has not changed direction. Hence the power is now flowing from the current source to the voltage source, ie: reverse power. Since the capacitors no longer conduct current, they are not shown. Notice now that T3 and T4 are forward biased, and can be turned on. Conversely, Q3 and Q4 cannot be turned off, since their anti-parallel diodes are conducting.

Figure 3D:
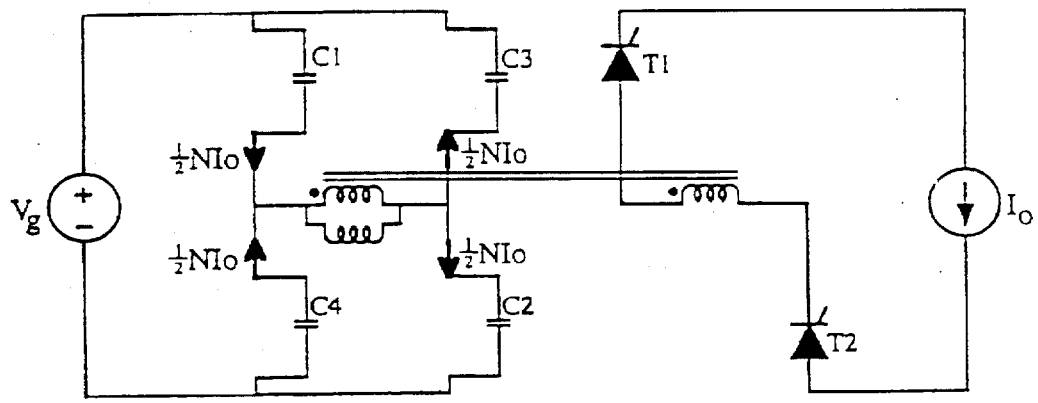

State 4. Invert Link Current #1. (FIG. 3D)

The secondary side SCRs T3 and T4 are now gated on by the control scheme. The gating of T3 applies a reverse voltage across the combination of T1 and its snubber, while T4 reverse biases T2 and its snubber. The is snubber inductors are now drawn in the figure since they are supporting voltage and are taking an active part in circuit operation. Thus current ramps down in T1 and T2, but ramps up in T3 and T4. This means that T1 & T2 turn off losslessly at zero current.

The link current changes polarity with controlled rate of change Similarly to the primary side transition, this state occurs for only a small proportion of one cycle of operation. In practice, the leakage inductance of the transformer will contribute to any discrete snubber inductors used, and may itself be sufficient.

Figure 3E:
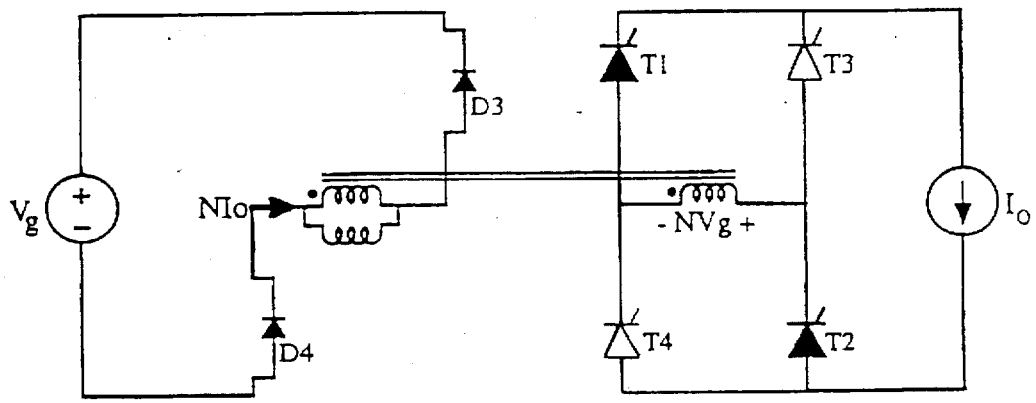

State 5. Forward Power #2. (FIG. 3E)

Now both the link voltage and the link current have changed polarity with respect to directions shown in state 1. Hence the direction of power flow is again forward, ie.: from voltage source to current source. The duration of this state is determined by the control scheme. Again notice that both T1 and T2 cannot be turned on since they are reverse biased, however Q3 and Q4 may be turned off since they are conducting forward current.

Figure 3F:
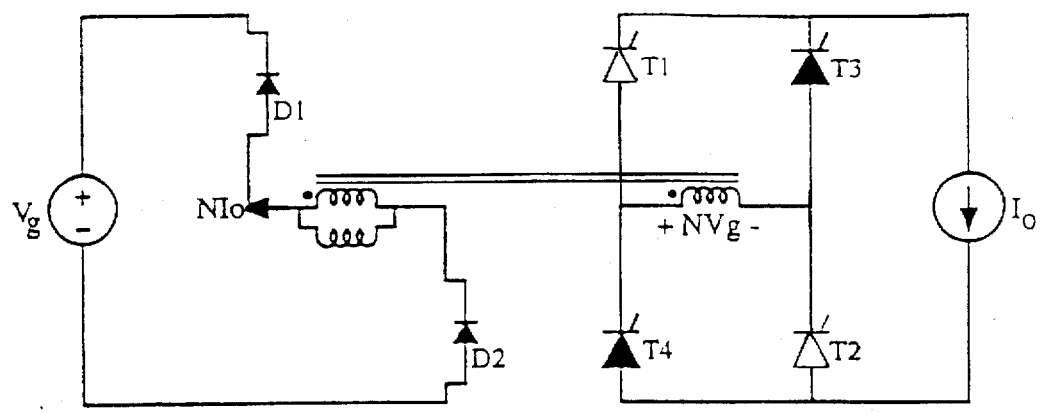

State 6. Invert Link Voltage #2. (FIG. 3F)

Now both Q3 and Q4 are turned off, leaving the circuit in the same state as for state 2 but with link current reversed. The link current continues to flow in the lossless snubber capacitors while the link voltage changes polarity at a controlled rate, until the anti-parallel diodes of Q1 and Q2 clamp the link voltage.

Figure 3G:
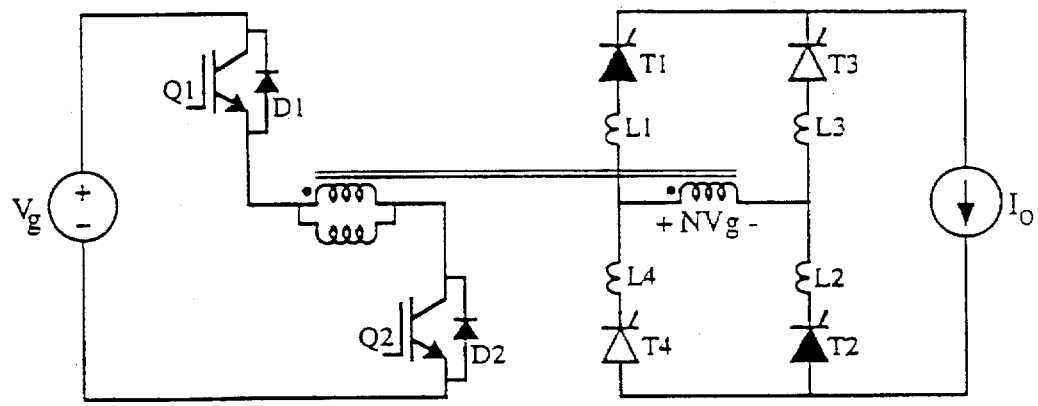

State 7. Reverse Power #2. (FIG. 3G)

Now the link current is flowing into the positive side of the voltage source, so power is flowing from the current source into the voltage source, ie. reverse power. Notice again that Q1 and Q2 cannot be turned off, but that T1 and T2 are forward biased and can be gated on. The duration of this state is determined by the control scheme.

Figure 3H:
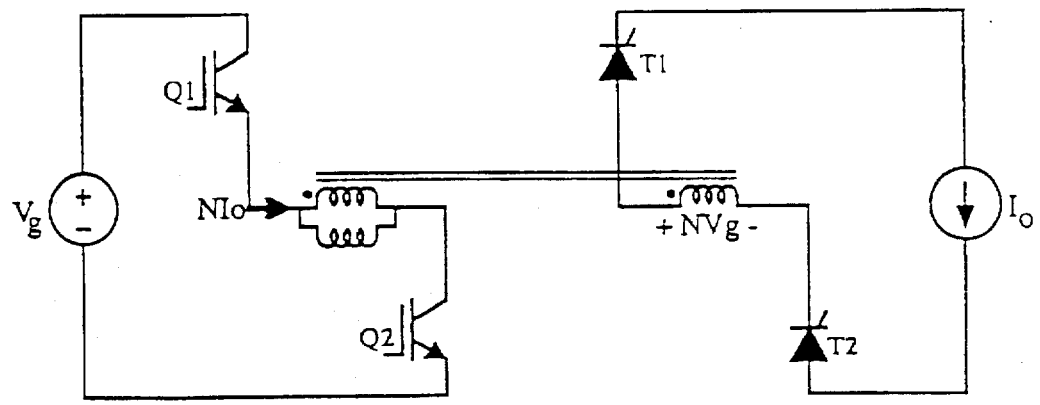

State 8. Invert Link Current #2. (FIG. 3H)

Now T1 and T2 are gated on, causing a transition of the secondary side similar to that described in state 4. This time T3 and T4 are turned off at zero current, while T1 and T2 turn on with di/dt snubbing. The link voltage stays constant, but the link current changes polarity at a controlled rate.

After the completion of state 8, the circuit reverts to state 1, and the cycle of operation repeats.

Waveforms. (FIG. 4)

Figure 4:
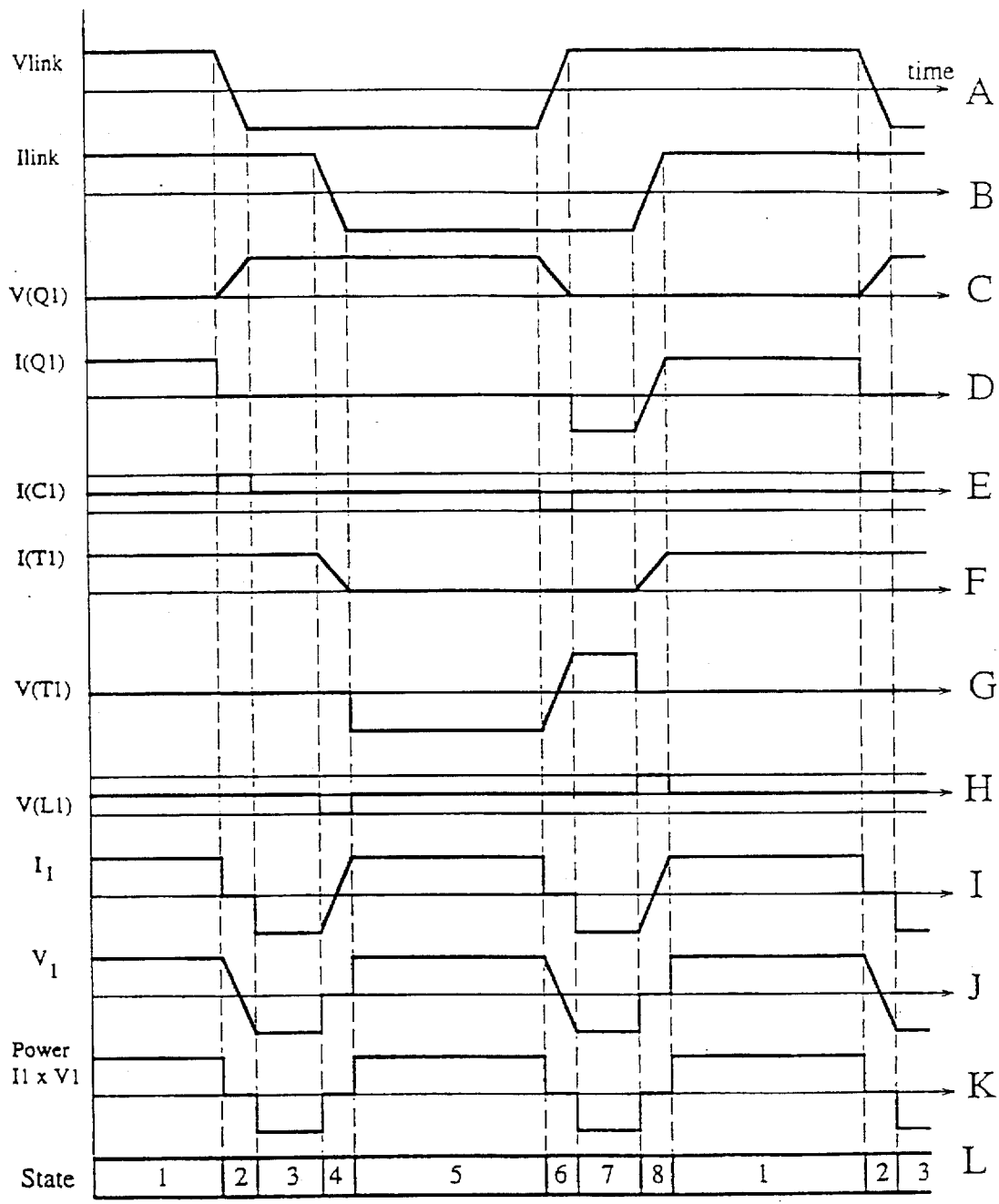

The idealised waveforms in FIG. 4 are intended to assist in understanding the operation of FICS as described above. Vlink (FIG. 4A) and Ilink (FIG. 4B) refer to the voltage and current appearing at the secondary side of the transformer. V(Q1) (FIG. 4C) and I(Q1) (FIG. 4D) are the voltage and current for Q1 in the ZVS-VSI, and I(C1) (FIG. 4E) is the current flowing through the loss-less snubber capacitor in parallel with Q1. The polarity of I(C1) is such that positive I(C1) indicates that V(Q1) is increasing. Note that I(C1) only flows when V(Q1) and hence Vlink are changing, and further, that I(C1) is only half the link current since the link current is shared with the snubber capacitor of Q4 (see state 2, FIG. 3B).

V(T1) (FIG. 4G) and I(T1) (FIG. 4F) refer to the voltage and current for thyristor T1 in the ZCS-CSI, and V(L1) (FIG. 4H) is the voltage across the snubber inductor in series with T1. Positive V(L1) indicates increasing I(T1). V(L1) is usually zero, except when the load current is being commutated from T1 to T3 and vice versa. During state 4 (FIG. 3D invert link current #1) current is being commutated from T1 to T3, and the current in T1 is decreasing, hence V(L1) is negative. Note that V(L1) is only half the link voltage, since half the link voltage is also being dropped across the snubber of T3. During commutation, the voltage appearing across the current source of the ZCS-CSI, $V_1$, is zero. Once commutation is complete, T1 and T2 both turn off and block reverse voltage during state 5 (FIG. 8E forward power #2), as indicated by the waveform V(T1).

During state 6 (FIG. 3F invert link voltage #2) Q3 and Q4 are turned off, V(Q1) reduces, and I(C1) is negative. Notice that during state 6 and state 7, V(T1) has changed from negative to positive, meaning T1 has become forward biased. T1 and T2 are fired at state 8 (FIG. 3H invert link current #2), and now V(L1) is positive as I(T1) increases.

Key Ideas

From the previous paragraphs and figures several key ideas may be extracted.

1. The primary side is switched during a period of forward power flow. (ie: the ZVS-VSI is switched when power flows from the ZVS-VSI into the link.)

2. The secondary side is switched during a period of reverse power flow. (ie: the ZCS-CSI is switched when power flows from the ZCS-CSI into the link.)

3. The link voltage and current waveforms appear as trains of symmetrical square waves with sloping edges ie: trapezoidal wave-shapes. This will effectively limit the amount of EMI produced by the link. Generally, the level of EMI increases with increasing di/dt and dv/dt.

4. The control of power flow in the link is exercised by varying the phase displacement between the link voltage and current waveforms. From FIG. 4K, the waveform of the link power shows clearly that the relative times of forward and reverse power flow will determine the average power flow through the link. In practice, the pulsating nature of the power flow in the link is smoothed and averaged by capacitive filters on the primary side (ZVS-VSI), and inductive filters on the secondary side (ZCS-CSI). This filtering technique is common practice.

5. Since the link voltage waveform is symmetrical and at a high frequency, a small high frequency transformer may easily be accommodated within the link.

An embodiment of the present invention will now be described. The present invention can be better understood if we consider the interaction of each switching network with the link, rather than the network to network interaction. That is, we shall now consider the interaction of the ZVS-VSI with the link, and the ZCS-CSI with the link. This simplifies the description and facilitates understanding of FICS systems embodiments which may have more than two switching networks.

The prior art by Barone et al of FIGS. 2 to 4 has a total of 8 distinct states, which are depicted in FIG. 3A to I. Considering the interaction of the ZVS-VSI with the link, we note that the full-bridge ZVS-VSI shown in FIG. 2 connects the source voltage $V_g$ to the link in only one of two ways: positive or negative polarity. States 2 (FIG. 3B) and 6 (FIG. 3F), during which the ZVS-VSI is changing state, are of short duration and do not significantly contribute to power transfer. Therefore, in states 1, 7, and 8 (FIGS. 3A, 3G, 3H) the ZVS-VSI connects the voltage source $V_g$ to the link in a positive direction (ie: the dot of the transformer is positive) States 3, 4, and 5 (FIGS. 3C, 3D, 3E) show the voltage source connected to the link in a negative direction.

Similarly, the prior art by Barone et al shows the ZCS-CSI connecting the current source Io to the link in only one of two ways: positive (out of the secondary side transformer dot) as shown in FIGS. 3A, 3B, & 3C, or negative (into the dot) as shown in FIGS. 3E, 3F, & 3G. States 4 (FIG. 3D) and 8 (FIG. 3H), during which the link current changes direction, are of short duration and do not involve significant power flow.

The present invention improves the prior art of Barone et al by allowing zero power to flow between the link and a switching network. A ZVS-VSI can be controlled to place zero volts across its connection to the link. Similarly, a ZCS-CSI can be controlled to place zero current into its connection to the link. Thus the switching network, either a ZVS-VSI or a ZCS-CSI, may now take on a "zero-power-flow state" or a "free-wheeling state". Descriptions of ZCS-CSI with zero-link-current capability, and ZVS-VSI with zero-link-voltage capability will be considered separately in the following sections.

ZCS-CSI with Zero-Link-Current Capability

The full-bridge ZCS-CSI shown in FIG. 2 only connects the load current to the link in one of two ways: positive or negative polarity. A third method of connection, whereby the current-stiff load is effectively disconnected from the link thus forcing the link current to zero, shall be called "zero-link-current state", or "zero-power-flow state", or "free-wheeling state". The use of this free-wheeling state realises the following benefits:

1. Improved control characteristics;
2. Reduced ratings for both the choke forming the current-stiff source in the ZCS-CSI, and the capacitor forming the voltage-stiff source in the ZVS-VSI;
3. Improved efficiency, since conduction losses are reduced when the load current free-wheels within the ZCS-CSI, without flowing into the link and the ZVS-VSIs.

Methods of achieving the free-wheeling state in various configurations of ZCS-CSIs will be discussed below.

ZCS Full Bridge. (FIG. 5)

By introducing extra states into the state transition diagram of FIG. 3, the current in the ZCS-CSI can be made to free-wheel within the ZCS-CSI itself without flowing into the link. State 4 of FIG. 3 (invert link current #1) may be replaced by the three (3) states denoted 4a, 4b, and 4c, shown in FIGS. 5A to 5C. State 8 of FIG. 3 (invert link current #2) may be replaced by the three (3) states denoted 8a, 8b, and 8c, shown in FIGS. 5D to 5F. It is not necessary to replace both state 4 and state 8 with their three state equivalents simultaneously. In fact state 4 may be considered the limiting case of the state sequence 4a, 4b, 4c, where the duration of state 4b is made exceedingly short. A similar argument applies for state 8. The duration of state 4b and 8b is entirely at the discretion of the control scheme.

Figure 5A:
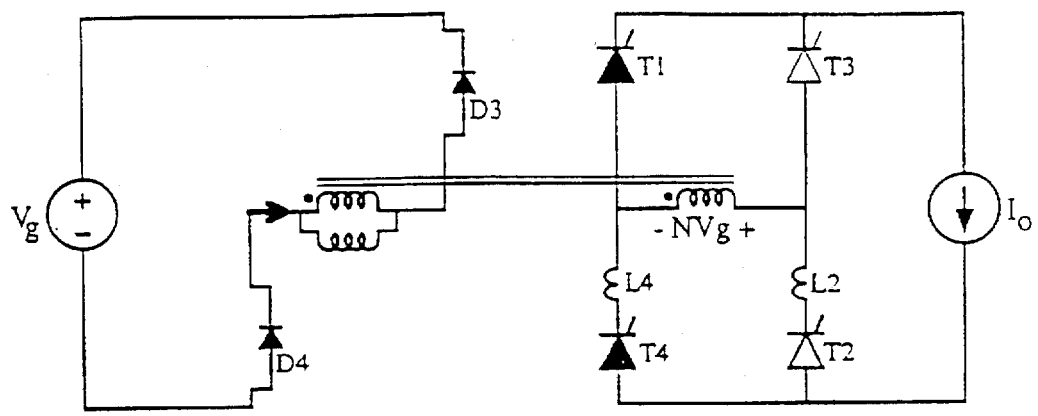

The operation is as follows. In FIG. 3 (State 3. Reverse power #1), T1 and T2 are conducting the load current ($I_o$) and both T3 and T4 are forward biased. Firing both T3 and T4 together would result in State 4. (Invert link current #1). However, by firing only one SCR, a zero link current state may be implemented. FIG. 5A (State 4a. Quench link current #1) shows just T4 being fired, while T3 is still forward biased but is not fired. The load current commutates from T2 to T4, at a rate determined by the commutating voltage provided by the link, $NV_g$, and the inductance in the loop formed by the link, T2, and T4. (The out-going ZCS-device is drawn with its arrow hollow, while the in-coming ZCS-device is drawn with a solid arrow.) The ink current is reduced as the load current is taken up by T4. The duration of this state is determined by the amount of load current, and the rate at which the current commutates from T2 to T4.

Figure 5B:
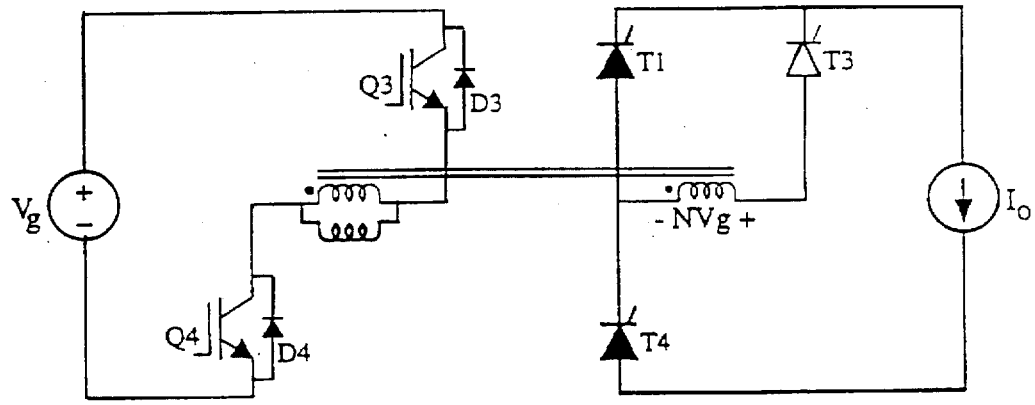

When the current in T2 is fully extinguished, the link current is zero, and the load current flows only through T1 and T4. This is depicted in FIG. 5B (State 4b. Zero link current #1). This is a stable state, in the sense that the duration of this state is determined by the control scheme. The output voltage of the ZCS-CSI is just the forward drop of T1 and T4, which, for the purposes of evaluating the control characteristics, may be approximated to zero volts.

Figure 5C:
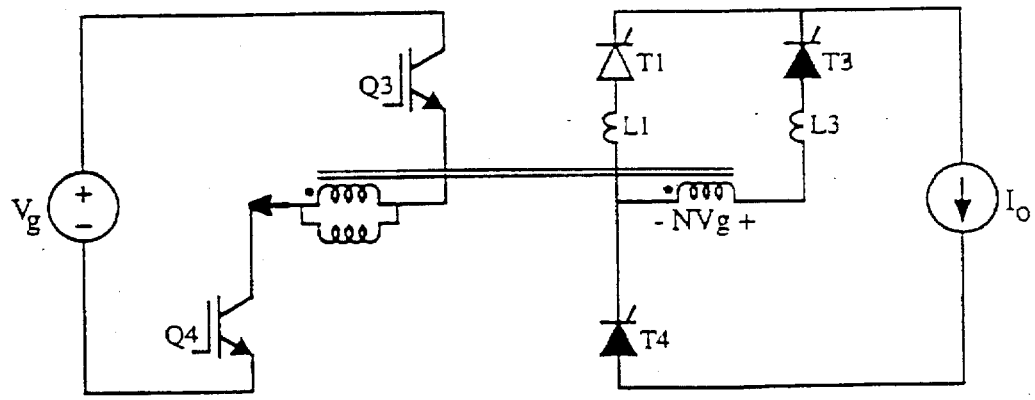

At the discretion of the control scheme, the remaining forward biased T3 can be fired. The load current commutates from Ti to T3, at a rate determined by the link voltage and the inductance in the loop formed by the link, T1, and T3, as shown in FIG. 5C (State 4c. Re-establish link current #1). The link current is now re-established, but in the opposite direction to the link current in state 3. At the end of this state when the current in T1 is zero and T1 turns off, the circuit returns to state 5 in FIG. 3, in which power flow is forward.

Figure 5D:
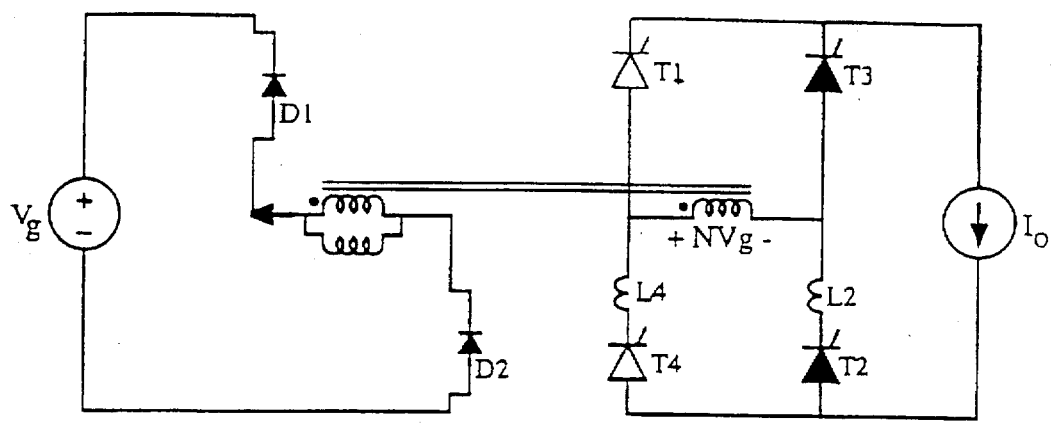
Figure 5E:
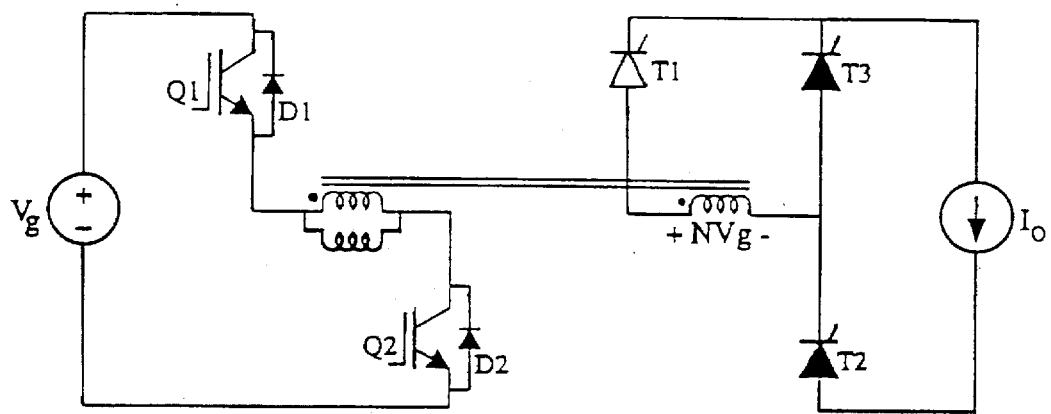
Figure 5F:
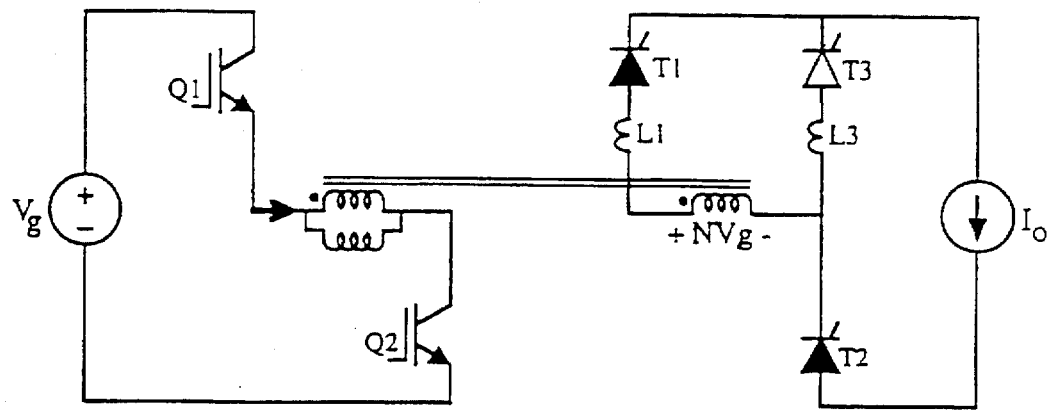

The firing sequence of the forward biased ZCS-devices is unimportant. In the above description, T4 was fired first to initiate the free-wheeling state, then T3 was fired to terminate the free-wheeling state and initiate the forward power state. However T3 can be fired before T4 with exactly the same effect, except that the load current free-wheels through T2 and T3 rather than T1 and T4. In this case, the above description still applies except that:

1. the references to T1 must be swapped with T2, and vice-versa.
2. the references to T3 must be swapped with T4, and vice-versa;

The state sequence for free-wheeling which replaces state 8 is shown in FIGS. 5D, 5E and 5F. The operation is similar to the above description, except that:

1. the link voltage is in the opposite polarity.
2. the zero link current period is initiated by firing either T1 or T3.
3. the zero link current period is terminated by firing the ZCS-device, either T1 or T3, that was not already fired in (2) above.

ZCS Full Bridge with Extra Switch. (FIG. 6)

In the above section the load current flowed through two (2) ZCS-devices during the zero link current period. By adding one (1) extra ZCS-device, making a total of five (5) ZCS-devices in the ZCS-CSI, the load current can be made to flow through only one (1) ZCS-device during free-wheeling. This may realise an improvement in efficiency.

Figure 6A:
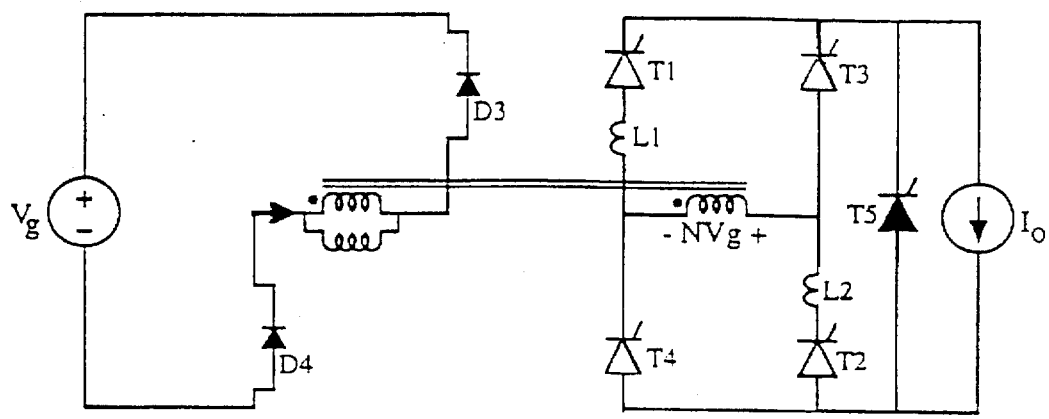
Figure 6B:
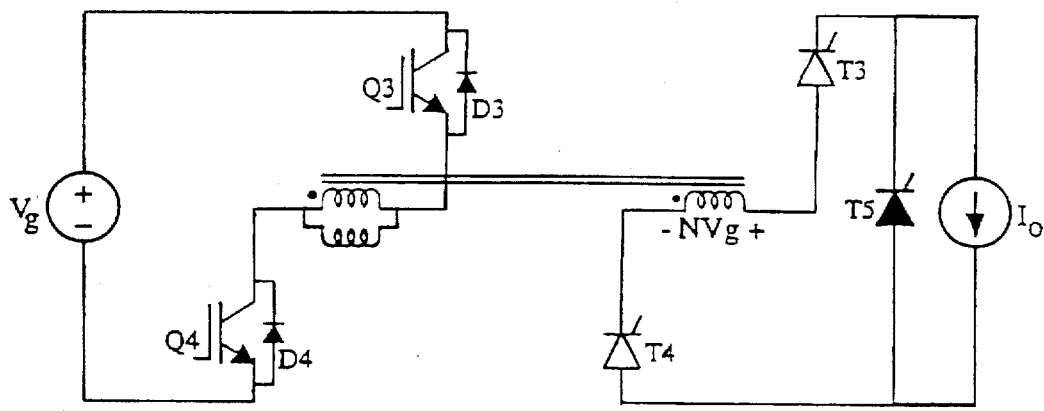
Figure 6C:
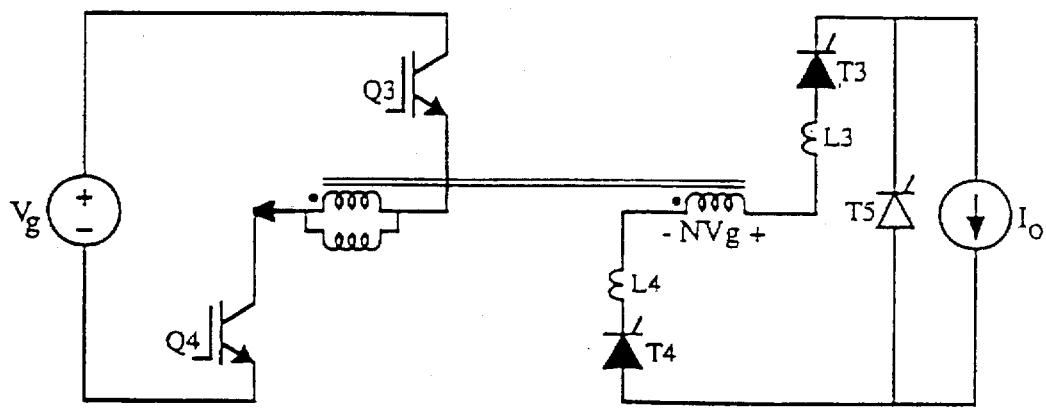

A diagram of the ZCS-CSI with an extra ZCS-device (denoted T5) appears in FIG. 6A. The operation of the circuit is as follows. In FIG. 3C (State 3. Reverse power #1), T1 and T2 are conducting the load current, and T3, T4, and T5 are forward biased. At a time determined by the control scheme, T5 is fired. Load current commutates from T1 and T2 into T5, as shown in FIG. 6A. When commutation is complete, the load current flows only in T5, as shown in FIG. 6B. The link current is re-established by firing T3 and T4 together, which reverse-biases T5 and initiates the next forward powering period, as shown in FIG. 6C (State 4c. Re-establish link current #1).

Figure 6D:
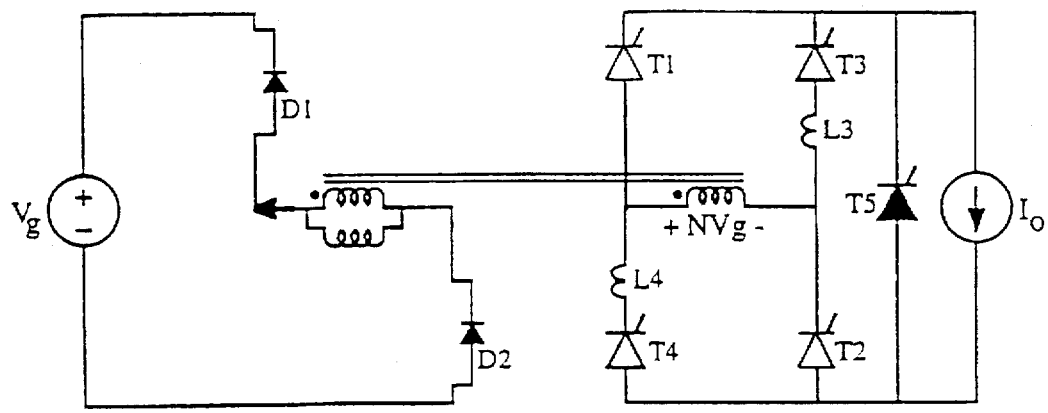
Figure 6E:
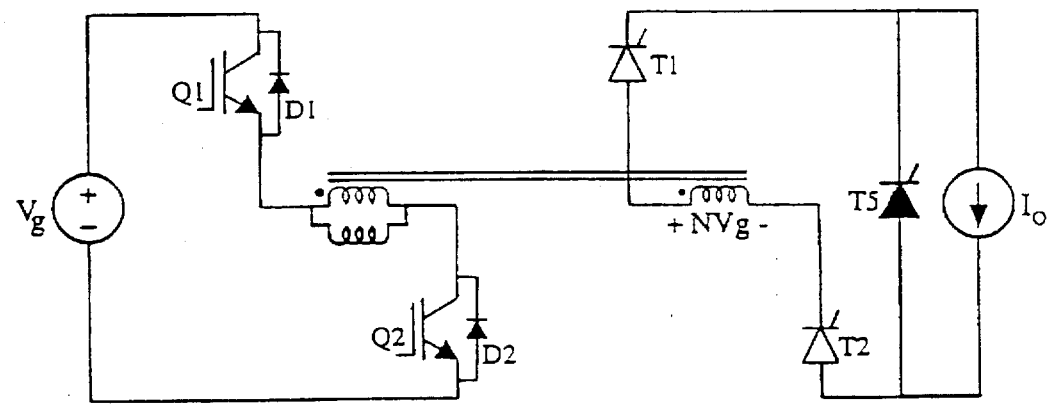
Figure 6F:
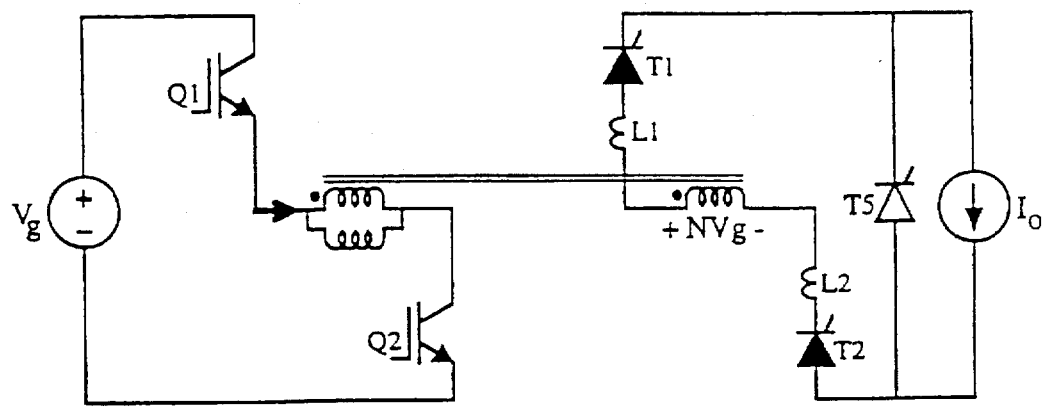

The complementary sequence when T3 and T4 are initially conducting is depicted in FIGS. 6D, 6E and 6F. In FIG. 3G (State 7. Reverse power #2), T3 and T4 conduct the load current. Firing T5 turns off T3 and T4 (FIG. 6D), and initiates the free-wheeling period (FIG. 6E). Firing T1 and T2 together reverse biases T5 (FIG. 6F) and starts the next forward powering period.

ZCS Push-Pull. (FIG. 7)

A ZCS-CSI may be configured in push-pull, where two switches are used to connect one current-stiff source to the link via two transformer windings. Push-pull inverters are not capable of providing a zero link current state. However, free-wheeling may be achieved by adding a third ZCS-device.

The circuit operation is depicted in FIG. 7. The ZVS-VSI is not shown, since only the link connection and link voltage are important to the operation of the ZCS-CSI. The connection to the link is via two transformer windings connected in a centre-tap arrangement. The polarity of the link voltage induced in each winding is shown.

Figure 7A:
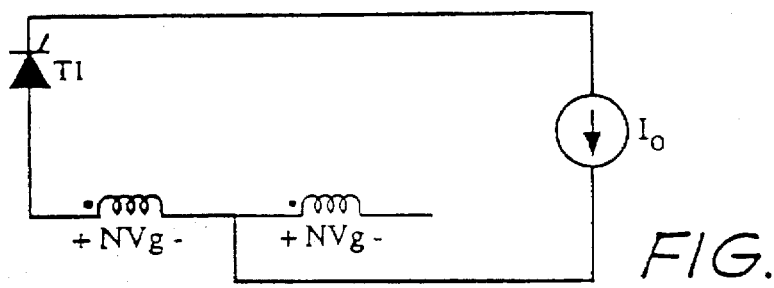
Figure 7B:
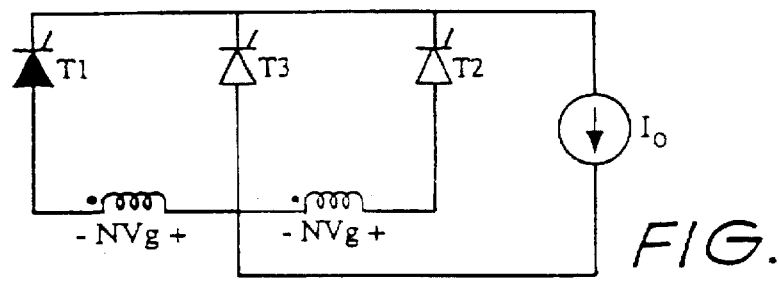

In FIG. 7A, T1 is conducting, T2 and T3 are reverse-biased, and the winding polarity is "dot-positive" so that power is flowing from the link into the current-stiff load, ie: forward power. In FIG. 7B the link voltage has changed polarity, thus forward-biasing T2 and T3, and power flow is now reversed.

Figure 7C:
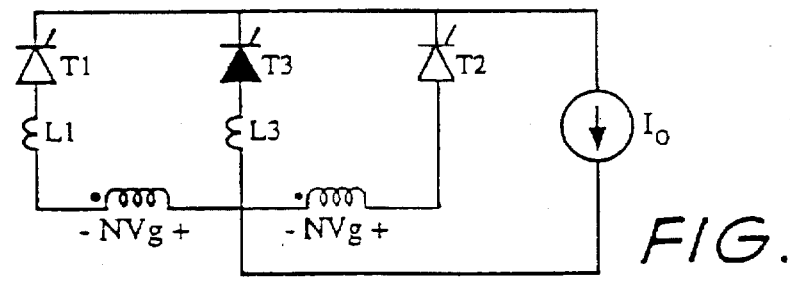
Figure 7D:
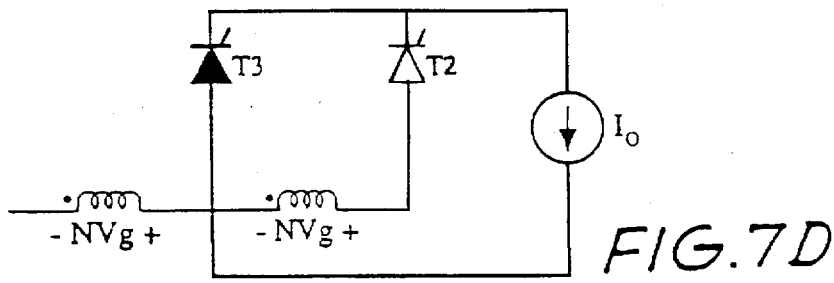
Figure 7E:
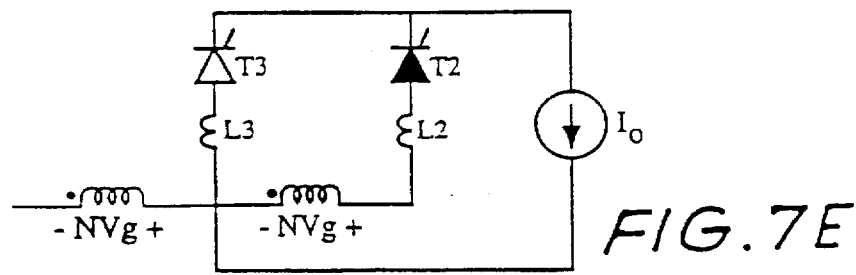
Figure 7F:
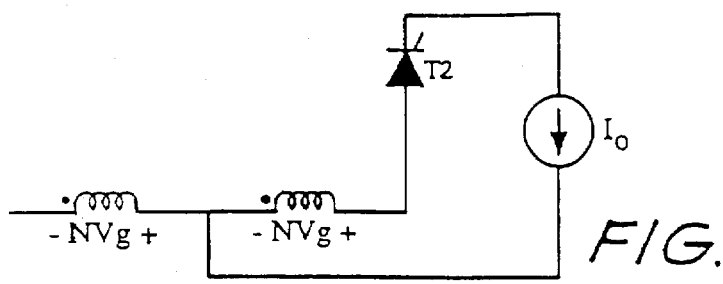
Figure 7G:
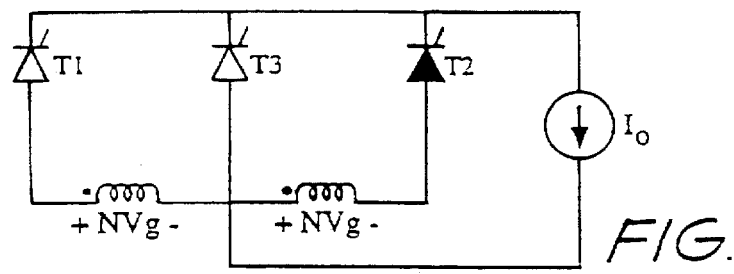
Figure 7H:
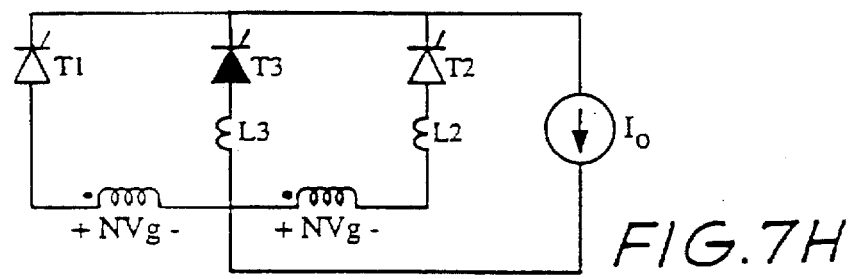
Figure 7I:
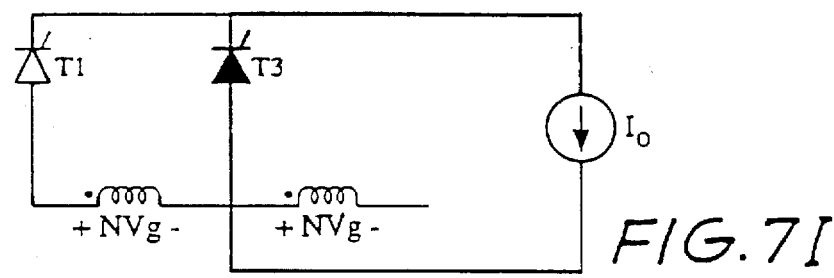
Figure 7J:
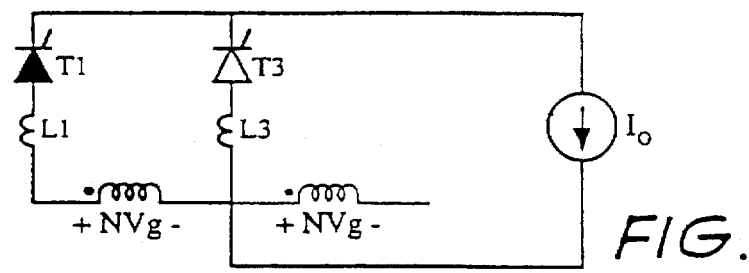

In FIG. 7C, under command of the control scheme, T3 is now fired, which causes the load current to commutate from T1 into T3, and quenches the link current. When T1 is fully off, the load current freewheels through T3, and no load current flows in the link, as shown in FIG. 7D. The duration of this freewheel state is determined by the control scheme. This state is terminated by firing T2, which reverse-biases T3 and initiates the next forward power state, as shown in FIG. 7E.

The complementary sequence is similar to that described above, and is depicted in FIG. 7F through FIG. 7J. Note that the link voltage has been reversed in FIG. 7G. During the next reverse power state, T3 is fired to reverse-bias T2 and initiate the next zero link current state. The next forward power state is initiated by firing T1, which reverse-biases T3 and results in the state shown in FIG. 7A.

ZCS Half-Bridge. (FIG. 8)

A ZCS-CSI may be configured in half-bridge, where two switches are used to connect two current-stiff sources to the link. The two current-stiff sources may be implemented simply by "splitting" the filter choke into two chokes. Half-bridge inverters are not capable of providing a zero link current state. However, free-wheeling may be achieved by adding two extra ZCS-devices.

The circuit operation is depicted in FIG. 8. The ZVS-VSI is not shown and the connection to the link is stylised as a transformer winding acting as a voltage source with polarity as indicated. However a transformer winding is not necessary as direct connection to the link is possible.

Figure 8A:
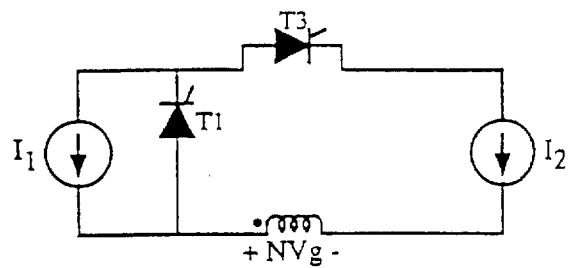

In FIG. 8A, T1 and T3 are conducting, while T2 is reverse-biased. T3 conducts current $I_2$ out of the positive side of the link, and T1 conducts both $I_1$ and $I_2$. Current is flowing out of the positive terminal of the link, so power flow is from the link to the ZCS-CSI ie: positive power flow.

Figure 8B:
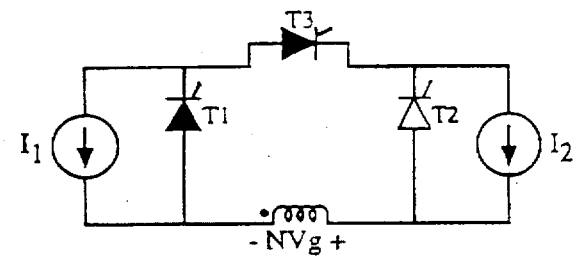
Figure 8C:
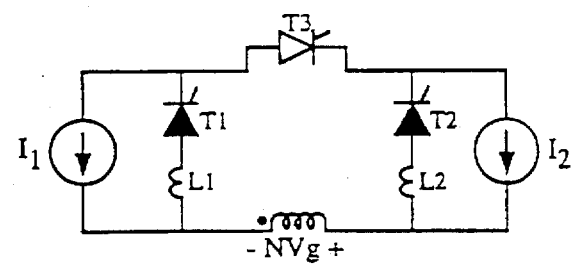
Figure 8D:
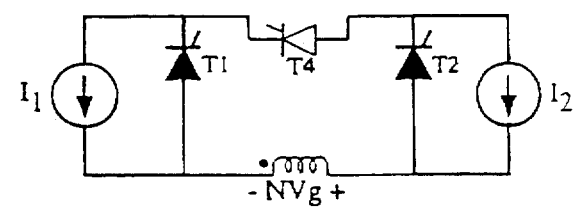

At a time determined by the control scheme, the link voltage changes polarity, and power flow is now in the reverse direction. T2 has now become forward biased, as shown in FIG. 8B. Under command by the control scheme, T2 can be fired, as shown in FIG. 8C. T1, T2, T3, and the link now form a commutation loop; the current that was flowing in T3 is taken up by T2, and T3 turns off. Since $I_2$ made up part of the current flowing in T1, the current in T1 is reduced by $I_2$. At the end of commutation the circuit is free-wheeling and looks like FIG. 8D, ie: there is no current flowing in the link; T1 conducts $I_1$; T2 conducts $I_2$; T3 is reverse-biased; T4 is forward biased. The circuit can remain in this state indefinitely.

Figure 8E:
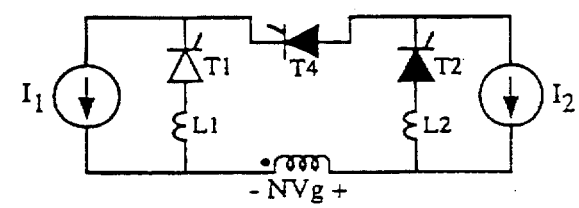
Figure 8F:
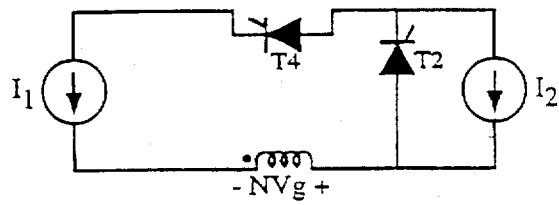
Figure 8G:
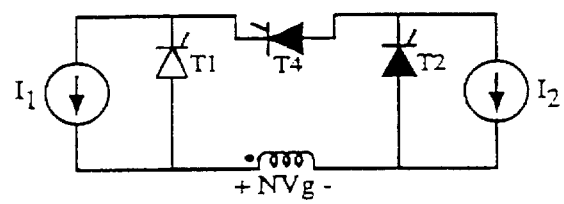
Figure 8H:
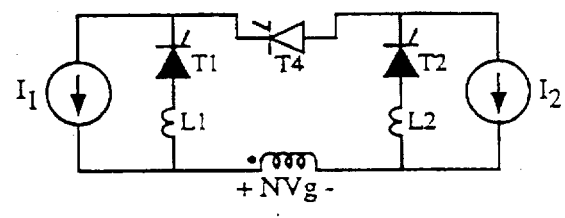
Figure 8I:
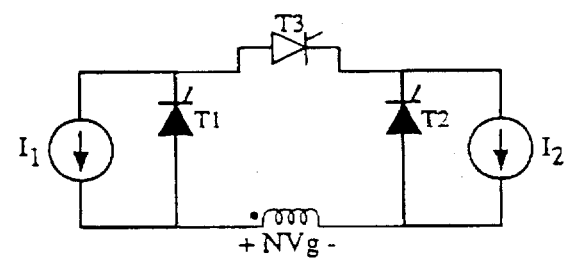
Figure 8J:
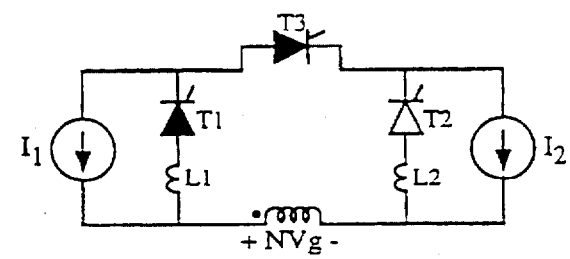

To terminate the free-wheeling period, T4 is fired, which reverse-biases T1, as shown in FIG. 8E. $I_1$ now commutates from T1 to T4 and adds to the current already flowing in T2. At the end of commutation T1 turns off and the next forward power state is initiated, as shown in FIG. 8F.

The complementary sequence is similar to that described above and is depicted in FIG. 8G through FIG. 8J. Note that the link voltage has been reversed in FIG. 8G. During the next reverse power state, T1 is fired to reverse-bias T4 and initiate the next zero link current state. The zero link current state is then terminated by firing T3, which reverse-biases T2, resulting in the forward power state depicted in FIG. 8A.

ZVS-VSI with Zero-Link-Voltage Capability

The full-bridge ZVS-VSI shown in FIG. 2 only connects the source voltage to the link in one of two ways: positive or negative polarity. A third method of connection, whereby the voltage-stiff source is disconnected from the link, and the link is effectively shorted, shall be called "zero-link-voltage state" or "zero-power-flow state". The use of this zero-link-voltage state realises the following benefits:

1. Improved control characteristics;
2. Reduced ratings for both the capacitor forming the voltage-stiff source in the ZVS-VSI, and the choke forming the current-stiff source in the ZCS-CSI;
3. Control of the magnetisation of the high-frequency link transformer, independent of the amplitude of the voltage source driving the ZVS-VSI. This may be an important attribute in applications where the amplitude of the voltage supplying the ZVS-VSI may vary widely, such as RAPS (remote area power sources) and other battery-fed applications.

ZVS Full Bridge. (FIG. 9)

By introducing extra states into the state sequence shown in FIG. 3, the full-bridge ZVS-VSI may be made to contribute a third voltage level to the link; that of zero volts. State 2 of FIG. 3, (invert link voltage #1) may be replaced by the three (3) states shown in FIGS. 9A, 9B, and 9C. State 6 of FIG. 3, (invert link voltage #2) may be replaced by the three states shown in FIG. 9D, to 9F. It is not necessary to replace both state 2 and state 6 with their three state equivalents simultaneously. In fact state 2 may be considered the limiting case of the state sequence 2a, 2b, 2c, where the duration of state 2b is made exceedingly short. A similar argument applies for state 6. The duration of state 2b and 6b is entirely at the discretion of the control scheme.

Figure 9A:
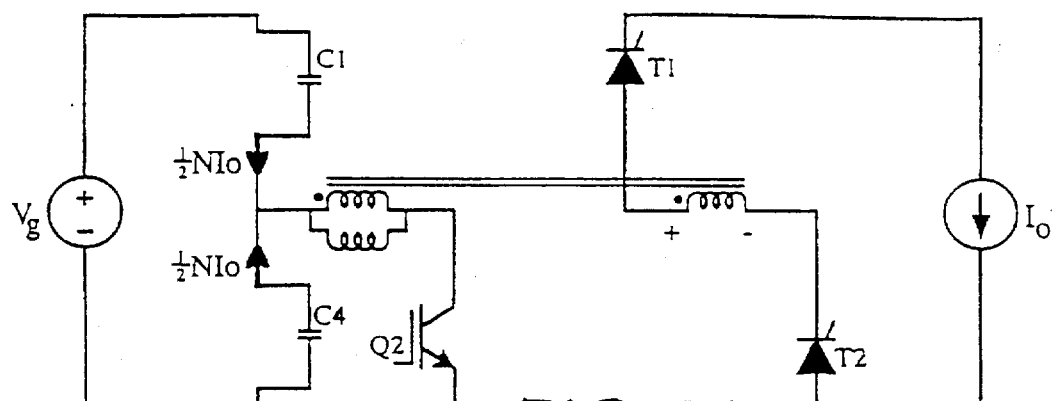

The operation is as follows. In FIG. 3 (State 1. Forward power #1) both Q1 and Q2 are conducting forward current and can be turned off. Turning off both Q1 and Q2 together would result in FIG. 3 (State 2. Invert link voltage #1). However, by turning off only one ZVS-device, the zero-link-voltage state may be implemented. FIG. 9A, (State 2a. Collapse link voltage #1) shows just Q1 being turned off, while Q2 remains on. The ZCS-CSI still forces the load current to flow out of the dot on the transformer secondary, so the current in the primary side must continue to flow into the dot. The primary-side load current commutates from Q1 into capacitors C1 and C4, and the link voltage collapses toward zero at a rate determined by the reflected load current (NI$_o$) and the value of capacitances C1 and C4. The duration of this state depends upon the value of the voltage source feeding the ZVS-VSI, and the rate at which the link voltage changes.

Figure 9B:
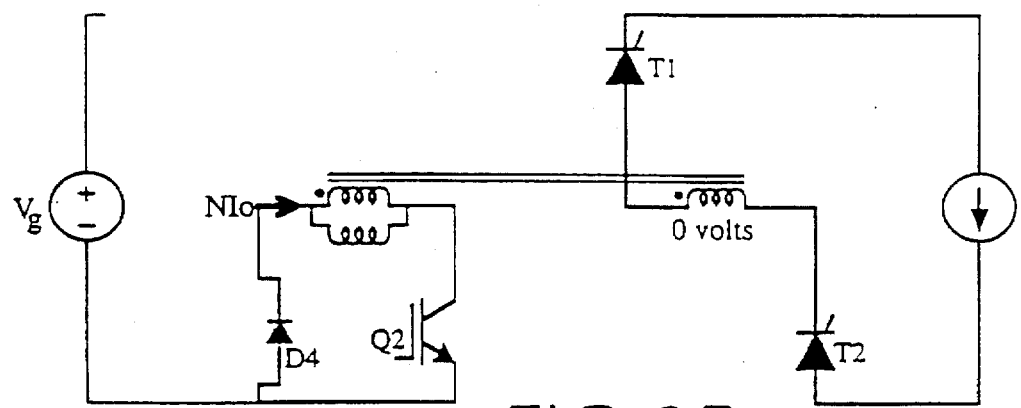

When the link voltage reaches zero and the voltage across Q4 reaches zero, D4 turns on and clamps the voltage across the link to approximately zero volts. This is shown in FIG. 9B (State 2b. Zero link voltage #1). This is a stable state since its duration is determined by the control scheme. Notice that no current flows from the voltage source feeding the ZVS-VSI. Also notice that the ZCS-CSI continues to force the load current to flow in the ZVS-VSI, in the direction indicated, which keeps Q2 in forward conduction.

Figure 9C:
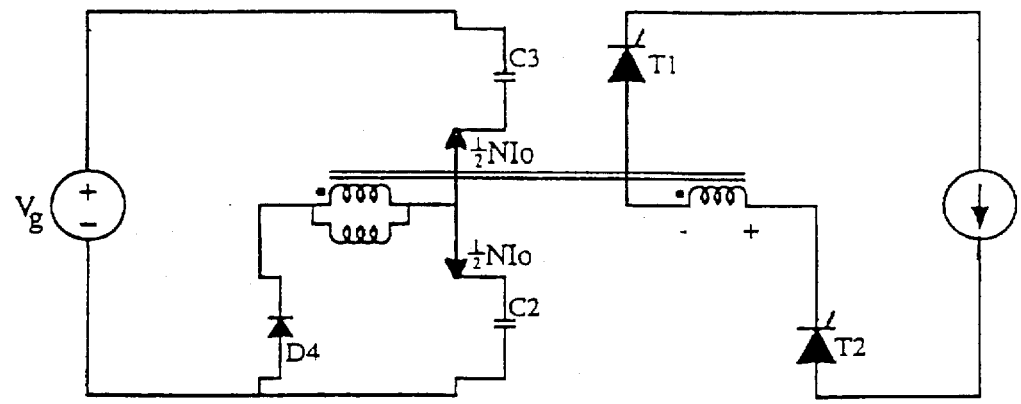

At the discretion of the control scheme, Q2 may be turned off. The ZCS-CSI again forces the load current to flow in the link in the direction indicated in FIG. 9C, and so the reflected load current (NIO) commutates into C2 and C3, as shown in FIG. 9C (State 2c. Re-establish link voltage #1). The link voltage is now re-established, but in the opposite polarity to the link voltage in state 1. The voltage across Q3 collapses, and at the end of this state D3 conducts, allowing Q3 to turn on at zero-volts. The circuit now takes on state 3 in FIG. 3 (State 3. Reverse power #1).

The order in which the forward-conducting ZVS-devices are turned off is not important. In the above description, Q1 was turned off first to initiate the zero-link-voltage state, then Q2 was turned off to terminate the zero-link-voltage state and initiate the reverse power state. However, Q2 could have been turned off first, then Q1 turned off second, with exactly the same effect, except that the current would flow through D3 and Q1 during the zero-link-voltage state.

Figure 9D:
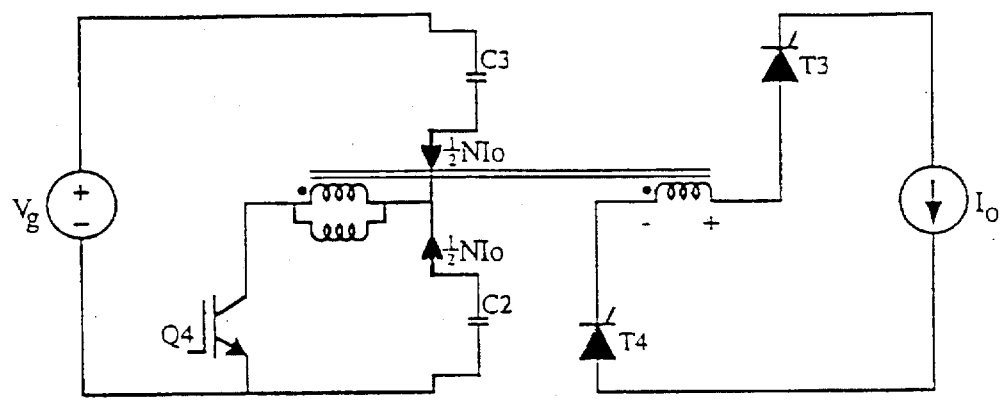
Figure 9E:
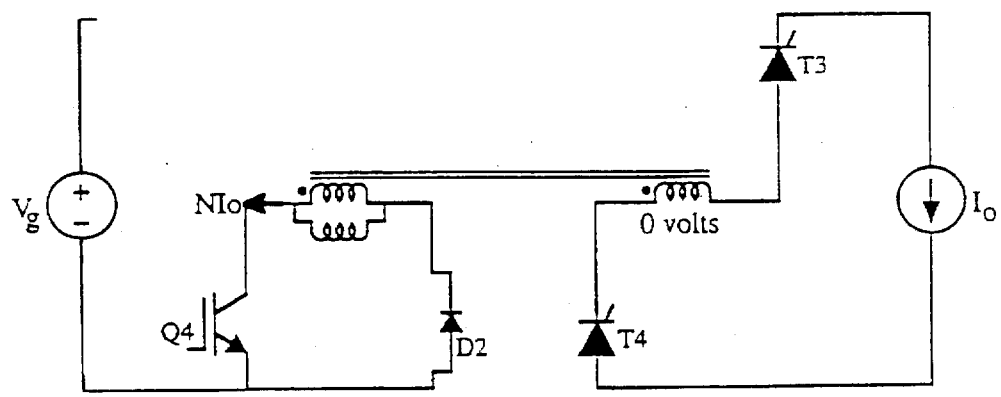
Figure 9F:
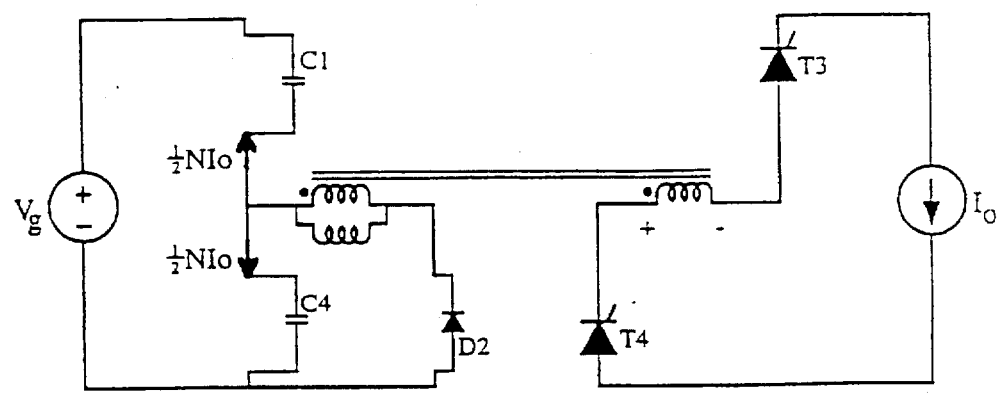

The state sequence for zero-link-voltage that replaces state 6 (FIG. 3) is shown in FIG. 9D to 9F. The operation is similar to the above description, except that:

1. the link current is in the opposite direction.
2. the zero-link-voltage state is initiated by turning off either Q3 or Q4.
3. the zero-link-voltage state is terminated by turning off the ZVS-device, either Q3 or Q4, that was not already turned off in (2) above.

ZVS Half-Bridge. (FIG. 10)

Two ZVS-devices may be used to connect two voltage-stiff sources to the link in a half-bridge arrangement. Half-bridge inverters are not capable of providing a zero-link-voltage state. However, zero-link-voltage may be achieved by adding two (2) extra ZVS-devices, which are denoted Q3 and Q4 in FIG. 10.

Figure 10A:
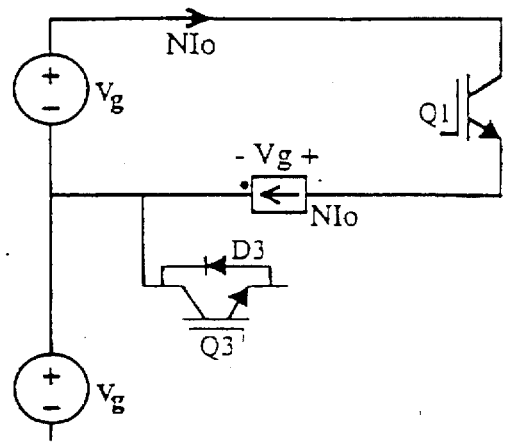
Figure 10B:
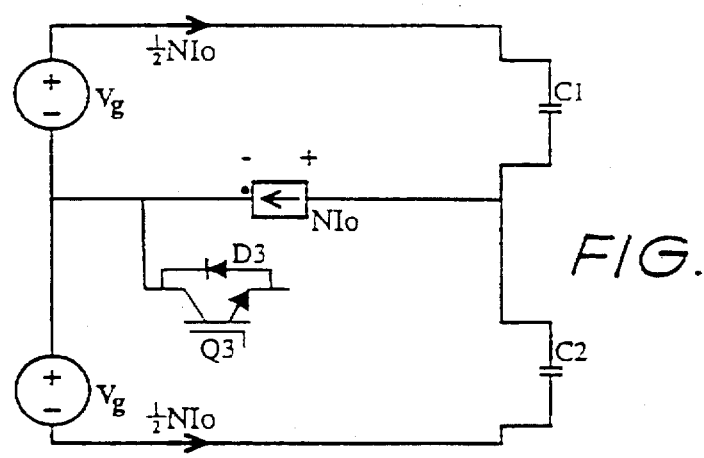
Figure 10C:
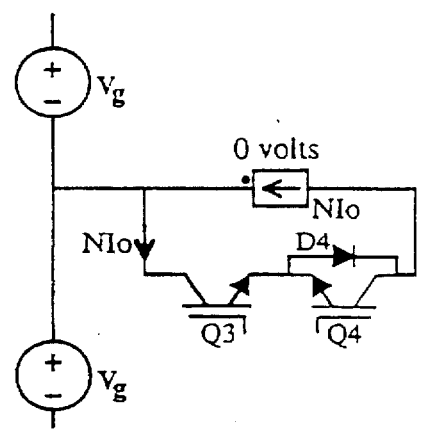
Figure 10D:
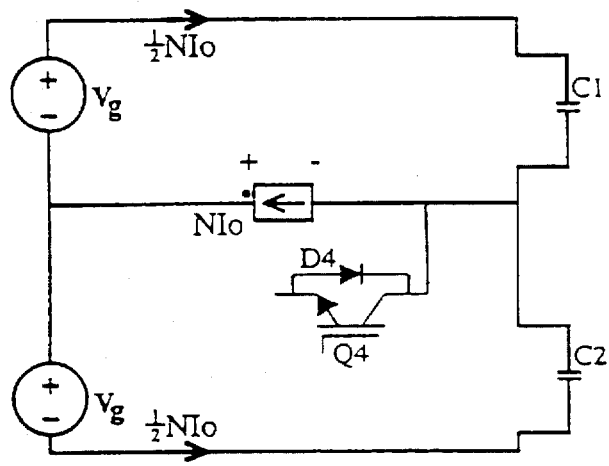
Figure 10E:
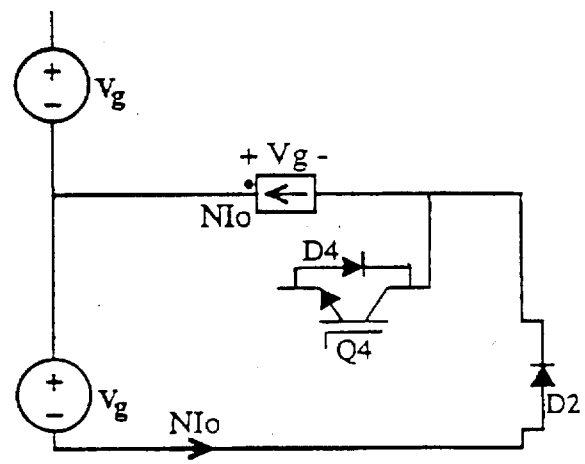
Figure 10F:
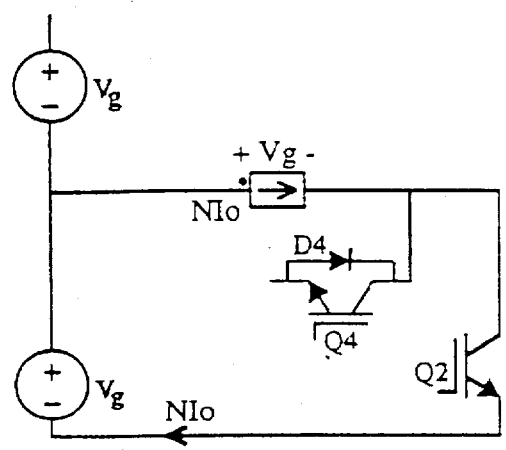
Figure 10G:
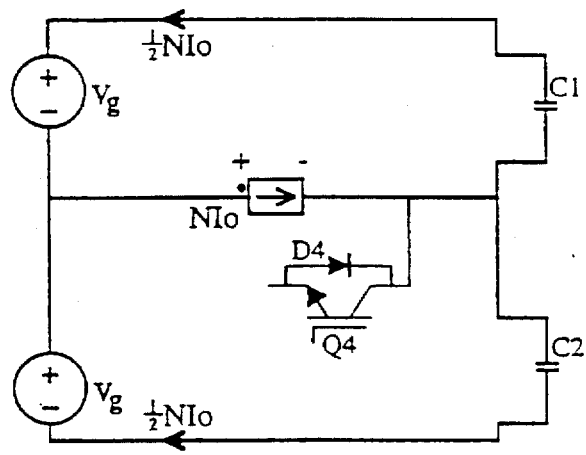
Figure 10H:
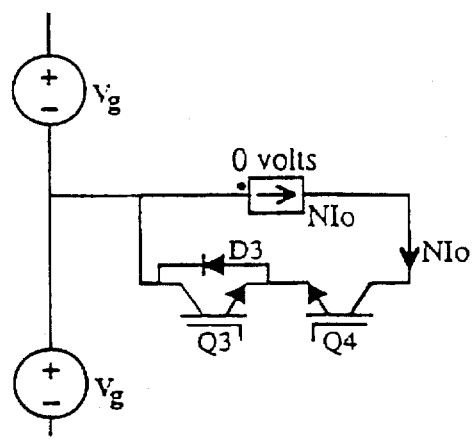
Figure 10:
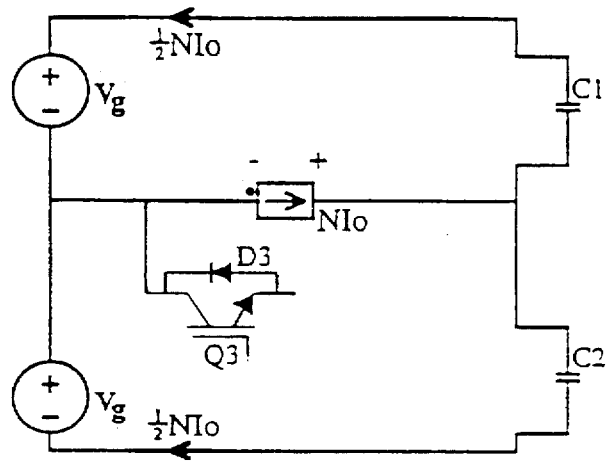
Figure 10:
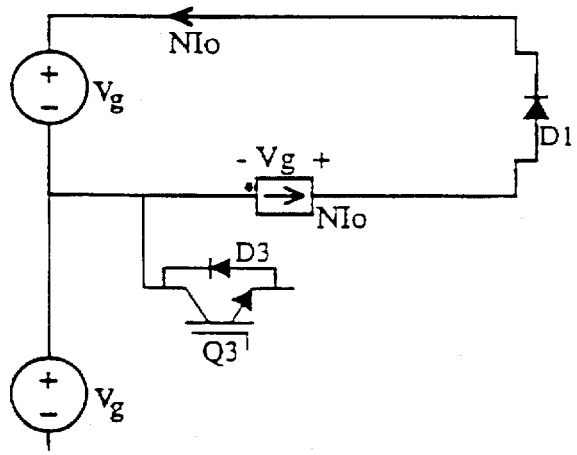

The circuit operation is depicted in FIG. 10. The ZCS-CSI is not shown, and the connection to the link is stylised as an ideal current source of magnitude $NI_o$ with polarity as indicated. The connection to the link may be made by way of a transformer winding, although a direct connection is also possible.

In FIG. 10A (State 1. Forward power #1), Q1 is conducting forward current, while Q3 is already turned on from the previous state, but is not conducting significant current. When Q1 is turned off, the link current diverts into C1 and C2, and the link voltage starts to collapse, as indicated in FIG. 10B (State 2a. Collapse link voltage #1). When the link voltage reaches approximately zero volts, D4 becomes forward biased, and the link voltage is clamped to zero volts, while the link current free-wheels through Q3 and D4, as shown in FIG. 10C (State 2b. Zero link voltage #1). Note that Q4 is now turned on at zero volts.

At the discretion of the control scheme, Q3 is turned off. As shown in FIG. 10D (State 2c. Re-establish link voltage #1), the link current is again diverted into C1 and C2, and the link voltage continues to ramp in the same direction as before. The link voltage is re-established but in the opposite polarity to that indicated in FIG. 10A. The voltage across Q2 collapses until D2 conducts, allowing Q2 to be turned on at zero volts. Power is now flowing from the link into the ZVS-VSI, as shown in FIG. 10E (State 3. Reverse power flow #1). Note that Q4 has been kept on, but is not conducting significant current.

Note that for all the transitions of the ZVS-VSI discussed above, the link current has remained in the same direction, and it has been assumed that the amplitude of the link current has remained essentially constant. Once reverse power flow occurs, the ZCS-CSI(s) may be switched, and the link current may be reversed such that the circuit is in a forward power state before the complementary transition of the ZVS-VSI.

The complementary transition of the ZVS-VSI is depicted in FIG. 10F through FIG. 10J. In summary, the forward power period shown in FIG. 10F (State 5. Forward power #2) is terminated by turning off Q2. The link voltage collapses (FIG. 10G) until D3 conducts, Q3 can be turned on, and the link voltage is zero (FIG. 10H). To terminate the zero-link-voltage period, Q4 is turned off and the link voltage is re-established (FIG. 10I) until D1 conducts and the next reverse power period commences (FIG. 10J).

VARIATIONS OF EMBODIMENTS

The circuit diagrams used thus far in describing the invention should not be taken as completely defining the bounds of the invention. The following sections attempt to list some of the circuit modifications that are possible without deviating from the intended scope of the invention.
Variations of the Power Circuit.
Connection of DC Blocking Capacitor.

It is common practice to place a capacitor in series with a transformer winding such that the zero-frequency (DC) component of the voltage applied to the transformer winding is eliminated. This reduces the possibility of transformer saturation. The value of the DC blocking capacitor is chosen such that the voltage that occurs across the capacitor is a fraction of the voltage exciting the transformer, typically 20% or less. The locations at which such a capacitor may be placed include, but are not limited to, the point at which the ZVS-VSI is connected to the link, or within the link itself.
Connection of Snubber Capacitors It may not be necessary to install a snubber capacitor in each and every ZVS-device. A single snubber capacitor, judiciously placed, may suffice. The locations at which such a capacitor may be placed include, but are not limited to, directly across the link, or across only one ZVS-device. The snubber capacitance may not even be required at all.
Connection of Snubber Inductors.

It may not be necessary to connect a snubber inductor in series with each ZCS-device. A single snubber inductor, in series with the link, may suffice. Indeed, the snubber inductance may be entirely made up by the stray wiring inductances present in any practical circuit, and/or the leakage of any transformer that might be used to connect the ZCS-CSI to the link.
Use of Non-Linear Snubber Capacitors Non-linear capacitors, or more precisely, capacitors with capacitance values that are a strong function of the applied voltage, may be gainfully employed as snubber capacitors. If the capacitance value is large when the applied voltage is low, and decreases as the voltage increases, then the capacitor will apply maximum snubbing to a ZVS-device that is turning off, without slowing the transition excessively.
Use of Non-Linear Snubber Inductors Non-linear inductors, also called "saturable inductors", or "magnetic amplifiers", offer great benefits in providing snubbing action for ZCS-devices during the moment of turn-on when snubbing is most required, without slowing the turn-on transition excessively. Saturable inductors are also useful in controlling diode reverse recovery; and in placing lower limits on the duration of reverse power periods (ie: when power flows from ZCS-CSI into link).
Use of Non-Linear Filter Chokes.

The use of a "swinging choke" is well known to those versed in the art as a means of obtaining a high value of filter inductance at light current levels, and smaller inductance values at heavier current levels from the same device. This provides the advantage of reducing the load current level at which the choke current becomes discontinuous. Discontinuous current can have a detrimental effect on the control characteristics of the system.
Use of Conventional Snubbers In any power electronic system, even soft-switching systems, it may be necessary to employ conventional "lossy" snubbers to control the switching transients. There are many reasons why lossy snubbers may be necessary. In a practical ZVS-device, for example, the stray inductance between the switching device and the lossless capacitive snubber may be significant. The stray inductance and the snubber capacitor form a resonant circuit which may exhibit "ringing" in the current and/or voltage waveforms of the ZVS-device. Further, practical snubber capacitors may have significant inductance in themselves, and practical snubber inductors may have stray capacitance. The types of snubbers may include, but are not limited to: RC snubbers; RCD snubbers to limit dv/dt which have different charge/discharge paths; and voltage-clamp snubbers; which are all well known by those versed in the art.

Use of Inductors to Drive ZVS Transitions at Light Link Current

The transitions of the ZVS-VSI(s) are driven by the link current. When the amplitude of the link current is small, the transitions may take a long time to complete, or may not even be driven to completion. By placing an inductance across the ink, some link current is guaranteed to flow, even if there is no link current provided by the ZCS-CSI(s). This inductance may be partially made up by, or wholly comprised of, the magnetising inductance of any transformer across the link. Inductors may also be placed at the point at which individual ZVS-VSIs connect to the link.

Use of Capacitors to Drive ZCS Transitions at Low Link Voltage

The transitions of the ZCS-CSI(s) are driven by the link voltage. When the link voltage is small, the transitions may take a long time to complete, or may not even be driven to completion. By placing a capacitor in series with the link, some link voltage is guaranteed, even if there is no link voltage provided by the ZVS-VSI(s). Capacitors may also be placed at the point at which individual ZCS-CSIs connect to the link.

Use of Uncontrolled Switches

It is not necessary to use functionally identical switches in the ZVS-VSIs or ZCS-CSIs. For example, one or more of the switches in a ZCS-CSI may simply be comprised of just a diode, which may or may not be in series with a saturable inductor. Such a switch will place restrictions on the controllability of the system. In this example, a ZCS-device comprised of a diode with series connected saturable inductor will place an upper limit on the time spent in reverse power flow. (ie: power flowing from ZCS-CSI to link.) This could limit the system to net forward power flow only.

Use of Different Switch Technology

Devices for controlling the flow of electric current may be implemented in many different ways. Devices for switching electric current include, but are not limited to, solid-state electric valves such as BJT, GTO, MOSFET and IGBT, alone with vacuum tubes and mechanical switches. An SCR may be used as a switch that can be turned OFF by providing a commutation circuit to extinguish the SCR current. It is intended that the scope of the invention include any apparatus that is capable of being used to control the flow of an electric current.

Use of Techniques to Improve Electromagnetic Compatibility

There are many different techniques for ensuring that electrical equipment is neither susceptible to, nor a source of, Electromagnetic Interference (EMI). Many of the techniques have to do with careful construction and layout of the final product, the use of shields, enclosures, and special EMI filters. All such techniques may be applied to the invention without in any way deviating from the intended scope.

Variations of the Control Circuit

The purpose of a control circuit is to control the relative duration of forward, reverse, and free-wheeling power states such that a desired outcome is achieved, subject to certain constraints. For example, in an UPS (uninterruptable power supply) application, it may be desirable that the output from the ZCS-CSI is a 240 V (rms), 50 Hz, sinusoidal voltage, subject to the constraints that the input voltage to the ZVS-VSI is from a nominal 48 V battery; that the output current shall be limited to 20 A (RMS); and that the peak magnetic flux density within the high-frequency transformer shall be limited to 250 milli-Tesla.

It is intended that many control schemes may be implemented without deviating from the scope of the invention. The invention clearly describes the sequence in which ZVS-devices and ZCS-devices may be switched; however, there are no restrictions on the method used to determine the exact times at which the switching should take place.

There are many control schemes that could be used to generate the required gating signals to control the power flow across the link. Some examples are:

Fixed Frequency PWM

The operation of FICS is divided into cycles of equal duration. During each cycle, FICS must execute forward, free-wheeling, reverse, and free-wheeling power states, in that order, the duration of each of which may be infinitely varied. At the completion of each cycle, FICS is left in the same state, which might conveniently be the free-wheeling state, but any state is just as possible. The relative duration of each of the states determines the net power flow through the link. Since the control is infinitely variable, the output can be controlled with a great accuracy.

Fixed Frequency Delta Modulation

At regular intervals of time, the performance of the system is evaluated, and a decision made whether the state should be changed. eg: if the present state is free-wheeling, and the output voltage drops below the desired value (the set-point) then the state will be changed to forward power flow. This type of control is not of the infinitely variable type; the action taken to correct the error can only be one of three given types, namely forward, free-wheeling, or reverse power flow; further, action to correct the error can only be taken at certain times. This type of control is much coarser than PWM, and consequently has poorer performance for a given switching frequency.

Hysteresis-Band Control

One of the system variables, typically the variable that is to be controlled, is monitored and compared to two threshold values, one either side of some setpoint value. If the control variable exceeds either of the thresholds, then the state of FICS is changed such that the control variable is moved back toward the setpoint, so that it stays within the bounds of the thresholds. With this system, the switching frequency is variable, and the control variable will always be moving about the setpoint, although the deviation from the setpoint can be made exceedingly small, subject to switching frequency and system stability constraints.

The following is a description of an embodiment of a control circuit for implementing one embodiment of the present invention.

FIG. 11A shows a block diagram form of an embodiment of the present invention. The power converter circuit is the same as shown in FIG. 2, but is drawn in block diagram form. It is comprised of:

a full-bridge ZVS-VSI (2) with four ZVS-devices (Q1–Q4);

a full-bridge ZCS-CSI (4) with four ZCS-devices (T1–T4);

a high-frequency link (3);

a voltage source (1);

and a current source (5).

ZVS sensors (7) on each ZVS-device (Q1–Q4) generate an output signal when the corresponding ZVS-device has turned on at zero volts. ZCS sensors (9) on each ZCS-device (T1–T4) generate an output signal when the corresponding ZCS-device has turned off at zero current.

A finite state machine (15) is the heart of the system. It has 16 different output states, each state corresponding to a state of the power converter as described by Barone et al., along with the extra states disclosed in this invention. For each state, one output line of the state machine becomes active. These 16 output lines are drawn as a 16-line wide bus (17). The finite state machine will sequentially step through each state when a particular input event has occurred. There are a total of 12 input events; 4 events from the ZVS sensors (7); 4 events from the ZCS sensors (9); and 4 events from timers. There are four timers (11, 12, 13, 14), each controlling the amount of time the power converter spends in:

forward power flow, states 1 and 5;

zero link voltage, states 2b and 6b;

zero link current, states 4b and 8b; and reverse power flow states 3 and 7.

For each state of the state machine (15), each switch in the power converter must be defined to either on or off. This is done by a look-up table (10), which decodes the 16 lines of the state machine output bus (17) and generates 8 outputs. Four of the look-up table outputs control the switches in the ZVS-VSI (2), and four outputs control the switches in the ZCS-CSI (4). The outputs of the look-up table (10) are amplified by the ZVS-VSI gate drivers (6) and the ZCS-CSI gate drivers (9) before passing to the ZVS-VSI (2) and the ZCS-CSI (4).

Each timer is only enabled by two distinct states. For example, the forward power flow timer (11) controls the duration of states 1 and 5, so it is only enabled by these states. This is shown on FIG. 11A, where the output lines corresponding to states 1 and 5 are tapped off the state machine output bus (17) and are input to the forward power flow timer (11). A similar arrangement exists for the other timers.

The definition of the state machine (15) appears in FIG. 11B. For each state, there exists only one event that will terminate that state and cause the state machine to advance to the next state in the table. For example, if the state machine is in state 1, then it will only advance to state 2a when the forward power flow timer (11) expires. The state machine may be implemented in many different ways, including, but not limited to, electronic technologies such as Programmable Logic Devices (PLDs) and Gate Array Logic (GAL), and also by software, as those versed in the art will know.

The definition of the look-up table (10) appears in FIG. 11C. Only one of the sixteen inputs can be active at any given time, and the look-up table (10) provides eight outputs as defined by FIG. 11C. The look-up table can be implemented in many different ways, including but not limited to, ROM (Read Only Memory), and also by software, as those versed in the art will know.

The supervisor (16) generates various control signals, such as clocks, enable signals, reset signals, and the like, to ensure smooth and correct operation of the system. It also ensures that the timers (11, 12, 13 and 14) are set to provide time durations designed to achieve a desired output of the power converter. Such a supervisor can be implemented in many ways, including but not limited to, micro-processor, micro-computer, or discrete logic devices, as those versed in the art will know.

Embodiments of the present invention may be used in many power conversion applications, eg inverters, remote area power supplies, uninterruptable power supplies, etc. The following are non-limiting definitions of "ZCS device", "ZVS device", "ZCS-CSI" and "ZVS-VSI" to assist understanding of the preceeding description:

ZCS-device

Any device which is turned off with zero current switching.

ZVS-device

Any device which is turned on with zero voltage switching.

ZCS-CSI

Zero-Current-Switching Current-Sourced-Inverter. An arrangement of switches, each of which behave like ZCS-devices. The arrangement is called an inverter, which can switch in a number of different configurations. The current flowing from the current-source into the input terminals can be switched such that it is forced to flow in the output terminals in either a positive or negative direction. Some ZCS-CSIs are capable of forcing the output current to be zero.

ZVS-VSI

Zero-Voltage-Switching Voltage-Sourced-Inverter. An arrangement of switches, each of which behave like ZVS-devices. The arrangement is called an inverter, which can switch in a number of different configurations. The voltage provided by the voltage-source at the input terminals can be switched such that it is forced to appear at the output terminals in either a positive or negative direction. Some ZVS-VSIs are capable of forcing the output voltage to be zero.

Variations and/or modifications may be made in the invention as described in the specific embodiments without departing from the spirit or scope of the invention as described and defined in the following statement of claims:

I claim:

1. A power conversion apparatus, comprising first and second switching networks, the first switching network being arranged to be connected to a source of constant voltage and the second switching network being arranged to be connected to a source of constant current, a link between the first and second switching network by way of which electrical power may flow between them, and control means for controlling switches in the switching networks to control the flow of electrical power, the control means being arranged to control the switching networks to exhibit a plurality of operating states during a single cycle of operation, the operating states including at least one forward power state, in which power flows across the link from the voltage source to the current source and at least one reverse power state in which power flows across the link from the current source to the voltage source, and at least one operating state of at least one of the switching networks is a zero power flow state, wherein there is no power flow between the link and the at least one switching network.

2. A power conversion apparatus in accordance with claim 1, wherein the zero power flow state is a zero link current state wherein no current flows between the link and the at least one switching network.

3. A power conversion apparatus in accordance with claim 1, wherein the zero power flow state is a zero link voltage state wherein no voltage from the at least one switching network is present at the link.

4. A power conversion apparatus in accordance with claim 1, the first switching network being configured and controlled to exhibit zero voltage switching and the second switching network being configured and controlled to exhibit zero current switching.

5. A power conversion apparatus in accordance with claim 4, the control means being arranged to control zero voltage switching and zero current switching so that they are complimentary between the first and second switching networks, whereby to increase efficiency and enable operation of the apparatus at relatively high frequencies.

6. A power conversion apparatus in accordance with claim 1, being arranged to be connected between any power source and load, means being provided for connection to the power source and load such that one of the power source and load acts as a constant voltage source for the duration of at least one cycle of the apparatus and the other of the power source or load acts as a constant current source for the duration of at least one cycle of the apparatus.

7. A power conversion apparatus in accordance with claim 1, wherein a plurality of first and/or second switching networks are connected to the link, each of the first and/or second switching networks being arranged to be connected to an independent source of constant voltage/current, whereby power conversion may be enabled between a plurality of loads/sources connected to a link by a plurality of switching networks.

8. A power conversion apparatus in accordance with claim 1, wherein a plurality of first and/or second switching networks are connected to the link, each of the first and/or second switching networks being arranged to be connected to the same source of constant voltage/current as the others, whereby power conversion may be enabled between a load/source via a plurality of switching networks.

9. A method of converting electrical power between two electrical systems having a link between them, comprising the steps of providing separate switching networks on either side of the link and controlling each of the switching networks to cause power to be transferred across the link between the electrical systems, the step of controlling switching of the networks comprising controlling the switches such that the networks exhibit a plurality of operating states during a single cycle of operation, the plurality of operating states including at least one forward power state and at least one reverse power state, the ratio of the forward power state to the reverse power state determining the net power transfer across the link, and at least one operating state of at least one of the switching networks is a zero power flow state wherein there is no power flow between the link and the at least one switching network.

10. A power conversion method in accordance with claim 9, wherein the zero power state is a zero link current state wherein no current flows between the link and the at least one switching network.

11. A power conversion method in accordance with claim 9, wherein the zero power flow state is a zero link voltage state wherin no voltage from the at least one switching network is present at the link.

12. A method in accordance with claim 9, the step of controlling the switching arrays comprising controlling one of the switching arrays to exhibit zero voltage switching and the other of the switching arrays to exhibit complimentary zero current switching, whereby to increase the efficiency of the arrangement and enable operation at relatively high frequencies.

13. A method in accordance with claim 9, comprising the further steps of providing a plurality of switching networks connected to the link, each of the switching networks being connected to a separate source/load and controlling the switching networks to cause power to be transferred across the link between the plurality of source/loads.

14. A method in accordance with claim 9, comprising the steps of providing a plurality of separate switching networks connected to the link and connected to a single source/load to enable power conversion for a single source/load by a plurality of switching networks.

* * * * *